United States Patent [19]

Jenkins et al.

[11] 4,151,593
[45] Apr. 24, 1979

[54] MEMORY MODULE WITH MEANS FOR CONTROLLING INTERNAL TIMING

[75] Inventors: Stephen R. Jenkins, Acton; Thomas A. Northrup, Westford; Robert E. Stewart, Stow, all of Mass.

[73] Assignee: Digital Equipment Corporation, Maynard, Mass.

[21] Appl. No.: 804,942

[22] Filed: Jun. 9, 1977

Related U.S. Application Data

[62] Division of Ser. No. 658,113, Feb. 13, 1976, Pat. No. 4,055,851.

[51] Int. Cl.² .................................. G06F 13/00
[52] U.S. Cl. ............................................ 364/200
[58] Field of Search ... 364/200 MS File, 900 MS File; 365/45, 48, 191, 199

[56] References Cited

U.S. PATENT DOCUMENTS 2,980,893  4/1961  Muroga ................................. 365/191

Primary Examiner—Raulfe B. Zache
Attorney, Agent, or Firm—Cesari and McKenna

[57] ABSTRACT

A random access memory module for connection in a memory arrangement for a digital data processing system that additionally includes a high speed associative memory unit. The associative memory unit contains a multiple location address memory and a multiple location data memory wherein there is a correspondence between each address location and a data location. Each time a central processor in the system initiates a reading operation, it issues an address to define a data location. If the associative memory unit contains that address at a location in its address memory, it performs a reading memory cycle and transfers data from the corresponding location in the data memory directly to the central processor. On the other hand, if the associative memory does not contain that address, it initiates a reading memory cycle with the random access memory module. In addition, each memory module contains a margin bit decoder that decodes various binary margin signals that are transferred to it for performing various control operations. For example, these signals can alter strobe timing in the memory module. A margin signal decoder converts the incoming binary signal into an analog strobe margin signal that may have one of several magnitudes depending upon the incoming memory module.

4 Claims, 23 Drawing Figures

MEMORY MODULE WITH MEANS FOR CONTROLLING INTERNAL TIMING

This application is a divisional of application Ser. No. 658,113, filed on Feb. 13, 1976 and assigned to the same assignee of this invention, which application now is U.S. Pat. No. 4,055,851, issued Oct. 25, 1977.

TABLE OF CONTENTS

Cross Reference to Related Applications
Background of the Invention
Summary
Brief Description of the Drawings
Description of an Illustrative Embodiment
  General Discussion
  Operation of Memory Management Unit 12
  Operation of Main Bus Map 23
  Operation of Associative Memory 24
  Operation of Back-up Memory System 29
    Control and Timing Circuit
    Margin Control Signals
    Reading Operation
    Writing Operation
    Exchange Operation

CROSS REFERENCES TO RELATED U.S. PATENT APPLICATIONS AND PATENTS

References are made in the Background of the Disclosure and Description of an Illustrative Embodiment to the following patents and patent applications which are assigned to the same assignee as the following invention.

U.S. Pat. No. 3,614,741 issued Oct. 19, 1971 for DATA PROCESSING SYSTEM WITH INSTRUCTION ADDRESSES IDENTIFYING ONE OF A PLURALITY OF REGISTERS INCLUDING THE PROGRAM COUNTER U.S. Pat. No. 3,614,740 issued Oct. 19, 1971 for DATA PROCESSING SYSTEM WITH CIRCUITS FOR TRANSFERRING BETWEEN OPERATING ROUTINES, INTERRUPTION ROUTINES AND SUBROUTINES U.S. Pat. No. 3,710,324 issued Jan. 9, 1973 for DATA PROCESSING SYSTEM U.S. Pat. No. 3,810,110 issued May 7, 1974 for COMPUTER SYSTEM OVERLAP OF MEMORY OPERATION U.S. Pat. No. 3,893,084 issued July 1, 1975 for MEMORY ACCESS CONTROL SYSTEM U.S. patent application Ser. No. 461,752 filed Apr. 17, 1974 for MEMORY UNIT FOR CONNECTION TO CENTRAL PROCESSOR UNIT AND INTERCONNECTING BUS, now U.S. Pat. No. 4,016,541 issued Apr. 5, 1977.

U.S. Pat. No. 3,854,126 issued Dec. 10, 1974 for CIRCUIT FOR CONVERTING VIRTUAL ADDRESSES INTO PHYSICAL ADDRESSES U.S. patent application Ser. No. 432,140 filed Jan. 10, 1974 for SECONDARY STORAGE FACILITY FOR DATA PROCESSING SYSTEMS, now U.S. Pat. No. 3,999,163 issued Dec. 2, 1976.

BACKGROUND OF THE INVENTION

This invention relates to a digital data processing system, and more specifically to a memory for use in such a data processing system.

In general a digital data processing system has three basic elements: namely, a central processor, a memory arrangement for storing programs and data for manipulation by the central processor, and input/output units for communicating with the central processor and memory arrangement. One important aspect of a memory arrangement is the dependence of the overall speed of the system on the operation of the memory arrangement. For example, if a memory arrangement performs a memory cycle to retrieve data from a location therein in 1.2 microseconds (i.e., its characteristic retrieval interval), the minimum time required to process an instruction is 1.2 microseconds. As two or more memory cycles are often required in order to process an instruction, the average time for processing each of successive instruction will be greater than the 1.2 microsecond characteristic retrieval interval.

Thus, in order to enable the data processing system to operate at the greatest possible speed, it is necessary to minimize the characteristic retrieval interval for the memory arrangement. However, memory cost generally increases as the characteristic retrieval interval is reduced. Therefore, the entire memory arrangement usually can not be constructed from fastest elements because its costs would be prohibitively high.

A memory arrangement for a data processing system thus may contain several types of memory units that have diverse characteristics. Each type has particular characteristics that make it suitable for specific applications. Generally a digital data procesing system includes a random access memory unit. The time required to obtain information from a random access memory unit is independent of the lcoation of the information most recently obtained. Such memory units have included magnetic cores or solid state devices as the storage elements. Magnetic core memory units are very popular because they are reliable and retain data even in the absence of electrical power. Their characteristic retrieval intervals are usually measured in terms of one or two microseconds. Semiconductor random access memory units are considerably faster than magnetic core memory units and have characteristic retrieval intervals on the order of hundreds of nanoseconds. However, they require constant electrical power to retain data. If the electrical power is interrupted, the contents are lost. Both types of random access memory units have similar costs and in some data processing systems they constitute the entire memory arrangement.

Direct access memory units include, conventionally, disk and drum memory units. Their characteristic retrieval intervals are slower than random access memory units and are measured usually in terms of milliseconds. However, they are able to store relatively large amounts of data at costs that are significantly less than the costs of storage in random access memory units. Generally a direct access memory unit is used to supplement the random access memory unit. In many memory arrangements, the contents of the two memory units are constantly being interchanged in order to provide the most rapid data processing operations with a minimum random access memory unit storage capability.

Sequential access memory units, such as magnetic tape memories, constitute another type of memory unit. These memory units often are used for archival storage or to provide a "copy" of the contents of the random access and direct access memory units. They have even longer characteristic retrieval intervals than direct access memory units have, but the storage costs again are significantly lower.

As previously indicated, a particular memory arrangement in a data processing system may include two or more of these memory units in combination. A typical memory arrangement might include a magnetic core random access memory unit and a direct access memory unit.

A more recent configuration includes both semiconductor random access memory units and magnetic core random access memory units. One such system is described in the foregoing U.S. Pat. No. 4,016,541. In this system the central processor normally communicates with various input/output devices and a magnetic core random access memory unit over an asynchronous bus. However, the central processor also transfers data to and from a semiconductor memory unit over a second bus to provide increased operating speeds. Typically the semiconductor memory unit has sufficient capacity to store a complete program or a significant portion of such a program.

All the foregoing memory units transfer data to or from locations identified by address signals. Another type of memory unit is an associative, or content-addressable, memory unit. In such a memory unit a location is selected on the basis of what it contains and not on the basis of its address. An associative memory unit is useful in several applications. For example, in a machine that utilizes virtual addresses, each location in the memory unit contains both a virtual address and the corresponding address for the actual location. Such a system is described in the foregoing U.S. Pat. No. 3,893,084.

Other systems combine an associative memory unit as a "cache" memory unit for storing small portions of a program. Each time the central processor issues a memory address during a memory retrieval cycle, the associative memory unit searches to determine whether an address storage location contains that address. If it does, data in a corresponding data storage location in that memory unit is immediately transferred to the central processor. If it does not, the contents of that location in the random access memory unit identified by the address, as well as data from a block of successive locations, are transferred to the associative memory unit. This memory arrangement can improve the overall speed of the memory whenever the data is contained in the associative memory unit because the memory operates with the speed of a semiconductor memory.

Given a specific combination of memory units, shorter characteristic retrieval intervals also can be attained by other methods. For example, the memory arrangement may include memory units that are divided into separate elements or banks so that sequential memory cycles in different elements can be "overlapped". One such memory arrangement that is described in the foregoing U.S. Pat. No. 3,810,110, contains memory units of different characteristic retrieval intervals, all connected to a common memory bus. However, separate memory retrieval control signals are required, so the operating programs for the central processor must determine which memory retrieval control signal is to be sent to initiate each memory cycle.

Therefore, it is an object of this invention to provide a memory system for a data processing system that enables overlapped transfers without the need for multiple control signals.

Another object of this invention is to provide a memory arrangement for a data processing system that contains diverse types of memory units combined in a cost effective manner.

Still another object of this invention is to provide a memory arrangement that can obtain random access memory units having diverse characteristics.

Yet another object of this invention is to provide a random access arrangement that is adapted for interleaved operation.

Still yet another object of this invention is to provide a memory arrangement including magnetic core memory units that has an average characteristic retrieval interval that is less than the characteristic retrieval interval for magnetic core memory units.

SUMMARY

A random access memory module includes timing circuitry that controls operations within that module in response to analog control signals. In accordance with this invention binary margin signals can be transmitted to the random access memory module. These binary margin signals are converted to analog signals that control the operations of the storage means by altering the value of the analog control.

This invention is pointed out with particularity in the appended claims. The above and further objects and advantages of this invention may be attained by referring to the following detailed description taken in conjunction with the accompanying drawings.

DESCRIPTION OF AN ILLUSTRATIVE EMBODIMENT

General Discussion

Figure 1:
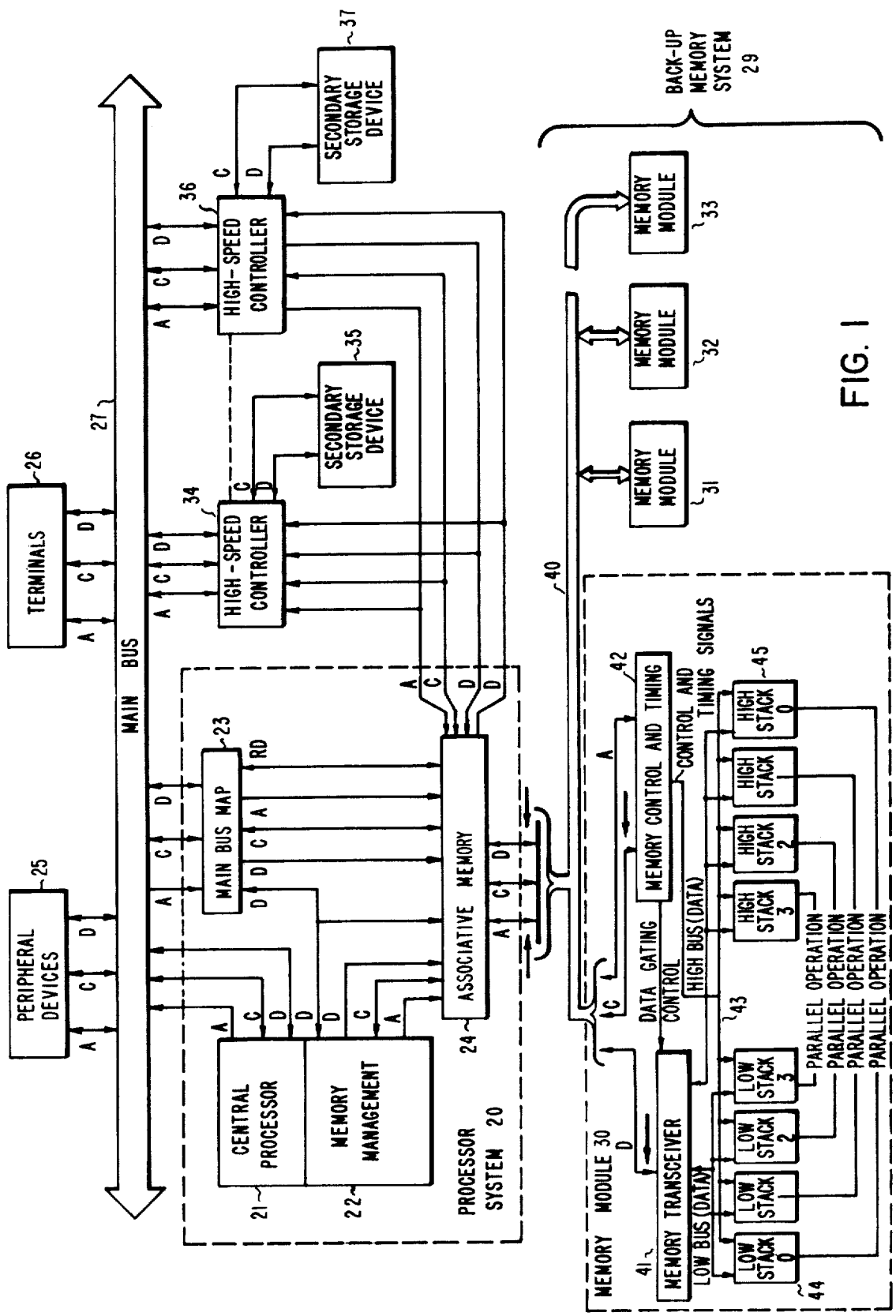
FIG. 1 is a block diagram of a data processing system which incorporates this invention.

It will be helpful in the following discussion to define certain terms. A "bit" is a binary digit. A "byte" is a measurable portion of consecutive binary digits, (e.g., an 8-bit byte). A "word" is an ordered set of bytes which occupies one storagae location and that is treated by the central processor as a unit. In a specific embodiment of the system shown in FIG. 1, the central processor operates with a 16-bit word comprising two 8-bit bytes. In the detailed drawings, a signal is "asserted" when it is at a positive level and "not asserted" when it is at a ground potential. However, data processing systems conventionally use "ground assertion" standards on interconnecting buses, so we include inverters to provide "ground assertion" signals on a bus and "positive assertion" signals for the other circuits. These inverters are shown but not identified in the drawings.

The phrase "memory cycle" includes a sequence of events occuring when information is transferred to or from a memory. The duration of a memory cycle for retrieving data from that memory is its "characteristic retrieval interval".

Now referring to FIG. 1, there is shown one embodiment of the data processing system which incorporates this invention. Basic elements in this system include a processor system 20 that includes a central processor 21, a memory management unit 22, a main bus map 23 and an associative memory 24. Peripheral devices 25 and terminals 26 are examples of input/output devices which communicate with the central processor 21 over a main bus 27. The construction and operation of the central processor 21 and communications with the peripheral devices 25 and terminals 26 over the main bus 27 are described in the aforementioned U.S. Pat. No. 3,614,740, U.S. Pat. No. 3,614,741 and U.S. Pat. No. 3,710,324.

The associative memory 24 contains only a few locations (e.g., 1024) for storing data.

Figure 2:
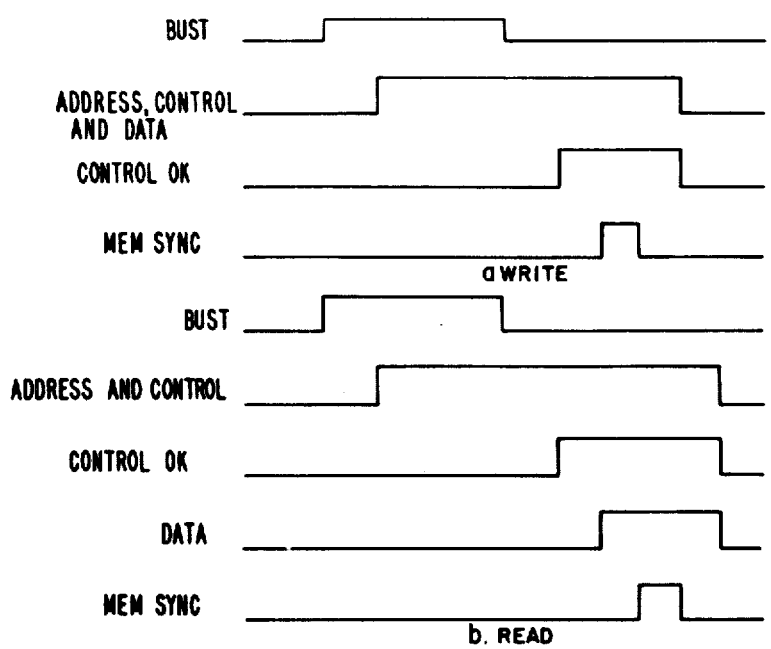
FIG. 2 indicates the control signals which pass between the central processor and associative memory shown in FIG. 1.

The transfer of data between the central processor 21 and the associative memory 24 is analogous to the transfer described in the aforementioned U.S. Pat. No. 4,016,541. FIG. 2 illustrates the corresponding signals and their respective timing sequences. The central processor 21 asserts a BUST signal to initiate a memory cycle of the type indicated by C0 and C1 control bits.

After the BUST signal is asserted, the control signals and address signals and, if a writing memory cycle, the data signals, are transmitted to the associative memory 24. As successive memory cycles may be overlapped, it is possible to initiate a memory cycle and then later terminate it if the program sequence is altered. The central processor 21 transmits to the associative memory a CONTROL OK signal when the memory cycle is to be continued. Then operations in the central processor terminate until the memory cycle is completed. After a delay during which the writing operation occurs or the data is retrieved, the associative memory 24 transmits back to the central processor 21 an MEM SYNC signal. This signal allows the processor to restart. During a reading memory cycle the MEM SYNC signal causes the central processor 21 to store the data in a buffer register.

Other signals which pass between the central processor 21 and the associative memory 24 include data parity signals and a BEND signal which the processor uses to abort a memory cycle initiated by a BUST signal.

Referring to FIG. 1, memory modules 30 through 33 constitute the main random access backup memory system 29 and include a plurality of magnetic core storage locations. The memory management unit 22 receives "virtual" addresses from the central processor 21 and expands the number of bits in each address to define actual locations. For example, the unit 22 in one embodiment expands 18-bit addresses from the central processor 21 to 22-bit addresses.

Peripheral device(s) and terminal(s) 25 and 26 also may communicate directly with random access memory in this system. As described in the aforementioned U.S. Pat. No. 3,710,324, transfers over the main bus 27 are performed when the central processor 21 or one of the peripheral devices 25 or terminals 26 gains control of the main bus 27 and becomes a "bus master". Any unit which becomes a bus master contains the necessary circuits for transmitting onto the bus address signals to define a "slave unit" and various control signals to initiate a reading or writing operation with the slave unit. However, the addresses transmitted by a bus master onto the main bus 27 do not define a unique location in the memory modules. The main bus map 23 performs the necessary address conversion and it is described in more detail later.

Figure 3:
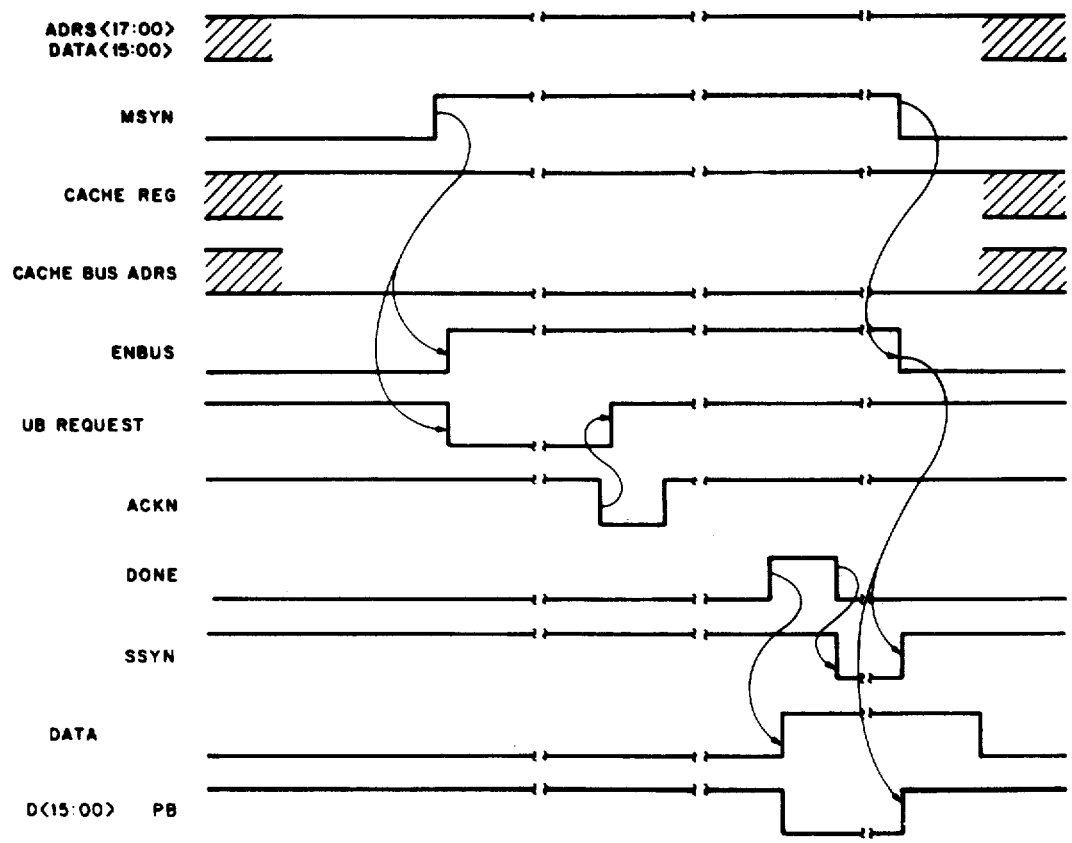
FIG. 3 illustrates the control signals which pass between a main bus mapping circuit and the associative memory shown in FIG. 1.

Referring to FIGS. 1 and 3, a bus master device transmits onto the bus 27, address (A) signals, C0 and C1 direction control (C) signals and, if the transfer is to the memory, data (D) signals. Thereafter the bus master transmits an MSYN signal that causes the main bus map 23 to transmit an ENBUS signal and a ground assertion UB REQUEST signal that initiate the memory cycle identified by the C0 and C1 signals from the main bus 27. Once the associative memory 24 initiates a memory cycle, it transmits a ground assertion ACKN signal which shifts the UB REQUEST signal to a non-asserted, or positive, level. After the memory cycle is completed, the associative memory transmits a DONE signal to indicate that the memory cycle has been completed. In the case of a transfer to the bus master, the main bus map 23 accepts data in response to the DONE signal and completes the transfer to the bus master by transmitting an SSYN signal onto the main bus 27.

The system shown in FIG. 1 also employs direct access memory facilities such as disk or drum units. Two such facilities are shown. In one, a high speed controller 34 connects to the main bus 27 and to the associative memory 24 and it also has connected to it one or more secondary storage devices 35. A similar high speed controller 36 and secondary storage device 37 are also shown in FIG. 1. High speed controllers and storage devices such as described in the aforementioned U.S. Pat. No. 3,999,163 are particularly adapted for use in this system. As described in that reference, the controller contains synchronous and asynchronous data paths. The asynchronous data path connects to the main bus 27 and the synchronous data path connects to the associative memory 24 in this system.

Figure 4:
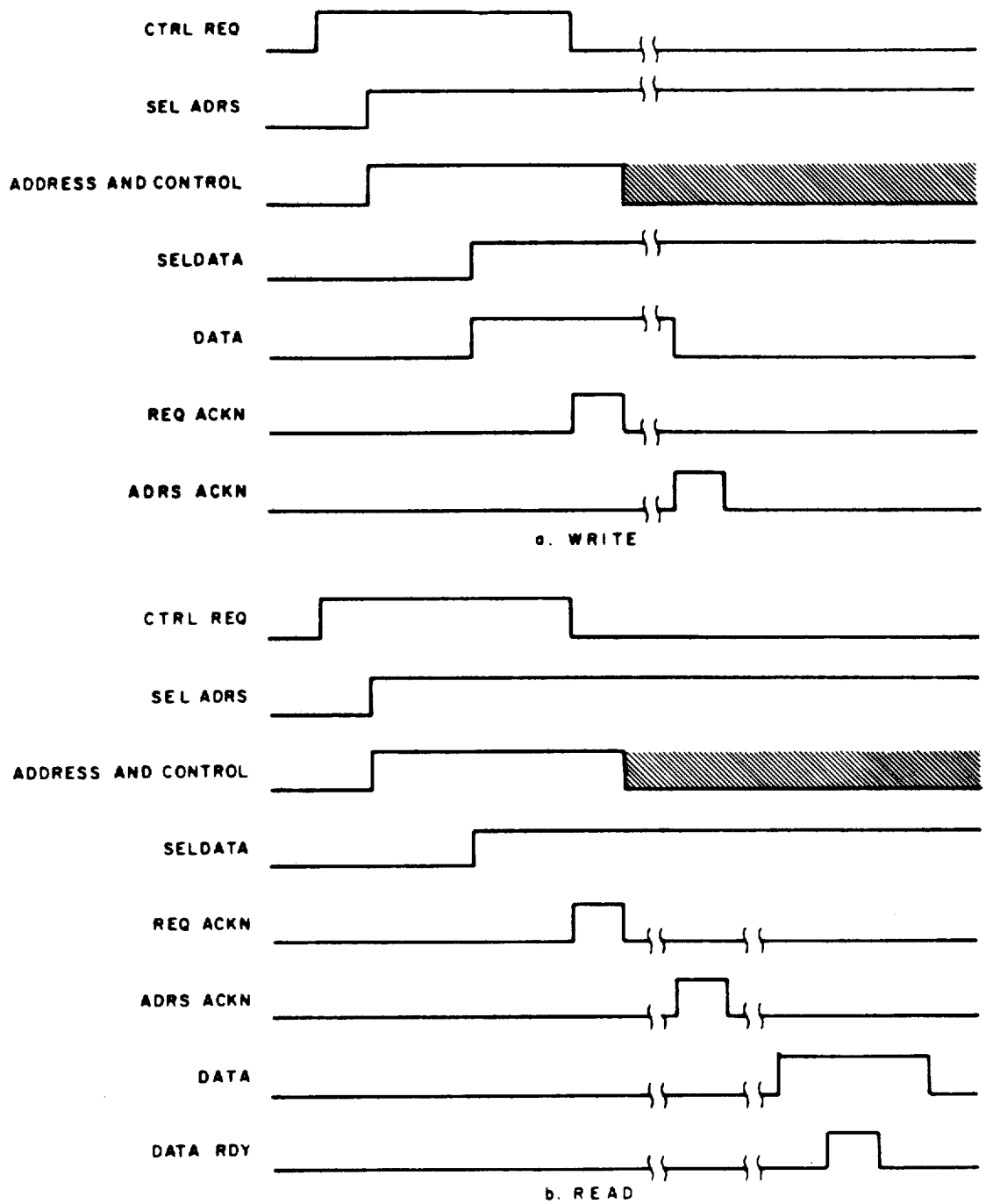
FIG. 4 illustrates the signals which pass between a high speed controller and the associative memory shown in FIG. 1.

FIG. 4 illustrates the signals that pass between a high speed controller such as controller 34 and the associative memory 24 over the various address (A), control (C) and data (D) conductors. When the high speed controller 34 is prepared to transfer data to or from an appropriate one of the memory modules 30 through 33 in a back-up memory system 29, it transmits a CTRL REQ signal. An arbitration circuit within the associative memory 24 selects one of the high speed controllers when two or more controllers transmit CTRL REQ signals simultaneously. The associative memory 24 then transmits back to the selected controller a corresponding SEL ADRS signal. The controller 34 then transmits the various address and control signals to the associative memory 24 that are necessary to effect the transfer. These include address signals and direction signals to indicate whether the transfer is to be to or from the memory unit. An SELDATA signal is then transmitted by the associative memory 24 to the corresponding selected high speed controller, thereby to enable the controller to transmit data and parity bits to associative memory 24. If the transfer is to the controller, the controller ignores the SELDATA signal.

Next, the associative memory 24 transmits a REQ ACKN signal as it begins servicing the request. The selected high speed controller removes its CTRL REQ signal from the bus in response to the REQ ACKN signal. When the REQ ACKN signal, that is received by the high speed controller, terminates, the address, control and, during a writing operation, the data signals, cease to be valid. The associative memory 24 also transmits to the high speed controller 34 an ADRS ACKN signal in response to an ACKNOWLEDGE signal (described later) from a memory module. This indicates to the selected high speed controller that one of the memory modules 30 through 33 is responding and, during a transfer to the memory module, it indicates that the current transaction has been terminated. When data is retrieved from the selected memory module, the associative memory 24 transmits a DATA RDY signal to initiate the reading operation in the high speed controller.

Thus, the associative memory 24 is a common element in communcations with the memory system 29. Moreover, any unit connected to the main bus can communicate with the memory modules 30 thorugh 33 through the associative memory 24. Such a transfer occurs during any transfer to a memory module (hereinafter a memory writing operation) or during a memory reading operation initiated by a bus master or high speed controller or initiated by the associative memory when it does not contain the requested data. During a writing operation, the associative memory 24 in FIG. 1 transmits various address and control signals (FIG. 5) onto a memory bus 40 to which all the memory modules 30 through 33 connect in parallel. Each memory module includes a memory transceiver 41, a memory control and timing circuit 42 and a plurality of memory stacks, or elements, interconnected by internal buses 43. Each memory stack, in one specific embodiment, stores in each location a number of bits which correspond to a standard computer word. However, pairs of stacks operate in parallel. One such memory stack is a "low stack" and the other memory stack in the pair is the "high stack". Corresponding stacks have the same number. Thus, reference numeral 44 designates "low stack 0" and reference numeral 45 designates "high stack 0", the pair together constituting "stack 0". Thus, a given location in a stack stores two "words" or four "bytes". As described later, the two low-order address bit positions identify a specific one of these bytes and the remaining address bit postions (i.e., 20 bit positions in a 22-bit address) define the particular stack and location within that stack. When data is retrieved from the memory, all the "words" in the addressed location are retrieved. During a writing operation, the associative memory 24 transmits BYTE MASK signals (FIG. 5) to the memory control and timing circuit 42 thereby to select one byte or some combination of bytes in the addressed location.

Figure 5:
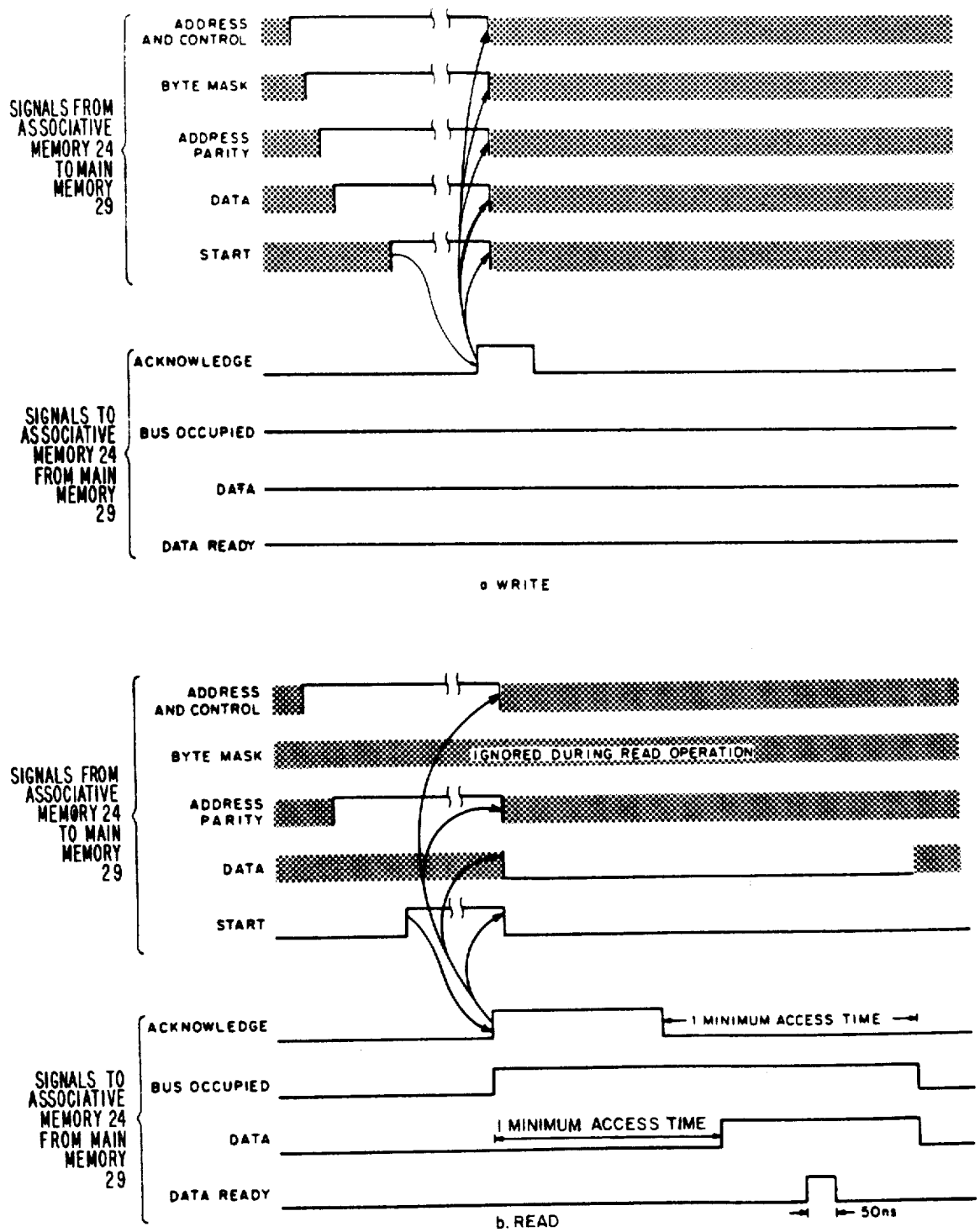
FIG. 5 depicts the signals which pass between a random access memory module and the associative memory shown in FIG. 1.

Still referring to FIGS. 1 and 5, the associative memory 24 transmits an ADDRESS PARITY signal which is based upon the value of the address and various control signals that initiate a memory cycle and also data signals if data is being transferred from the associative memory 24. Next the associative memory 24 transmits a START signal that enables the memory control and timing circuit 42 (FIG. 1) to initiate a memory cycle. The circuit 42 transmits back to the associative memory 24 an ACKNOWLEDGE signal that terminates the address and control signals and the BYTE MASK, parity, data and START signals. During a reading memory cycle, the associative memory 24 can initiate another memory cycle with another memory unit after the ACKNOWLEDGE signal is terminated.

No other signals are transmitted by a memory unit back to the associative memory 24 during a writing operation. During a reading operation, on the other hand, the associative memory 24 receives a BUS OCCUPIED signal and the ACKNOWLEDGE signal. After a predetermined interval, the ACKNOWLEDGE signal automatically terminates and the data is then transmitted onto the data conductors in the bus 40 by the memory unit. The presence of the data on these conductors is indicated when the memory control and timing circuit 42 transmits a DATA READY pulse. Thereafter the BUS OCCUPIED and data signals are terminated to complete the reading memory cycle and transfer the data to the associative memory 24.

Operation of MEMORY MANAGEMENT UNIT 22

Figure 6:
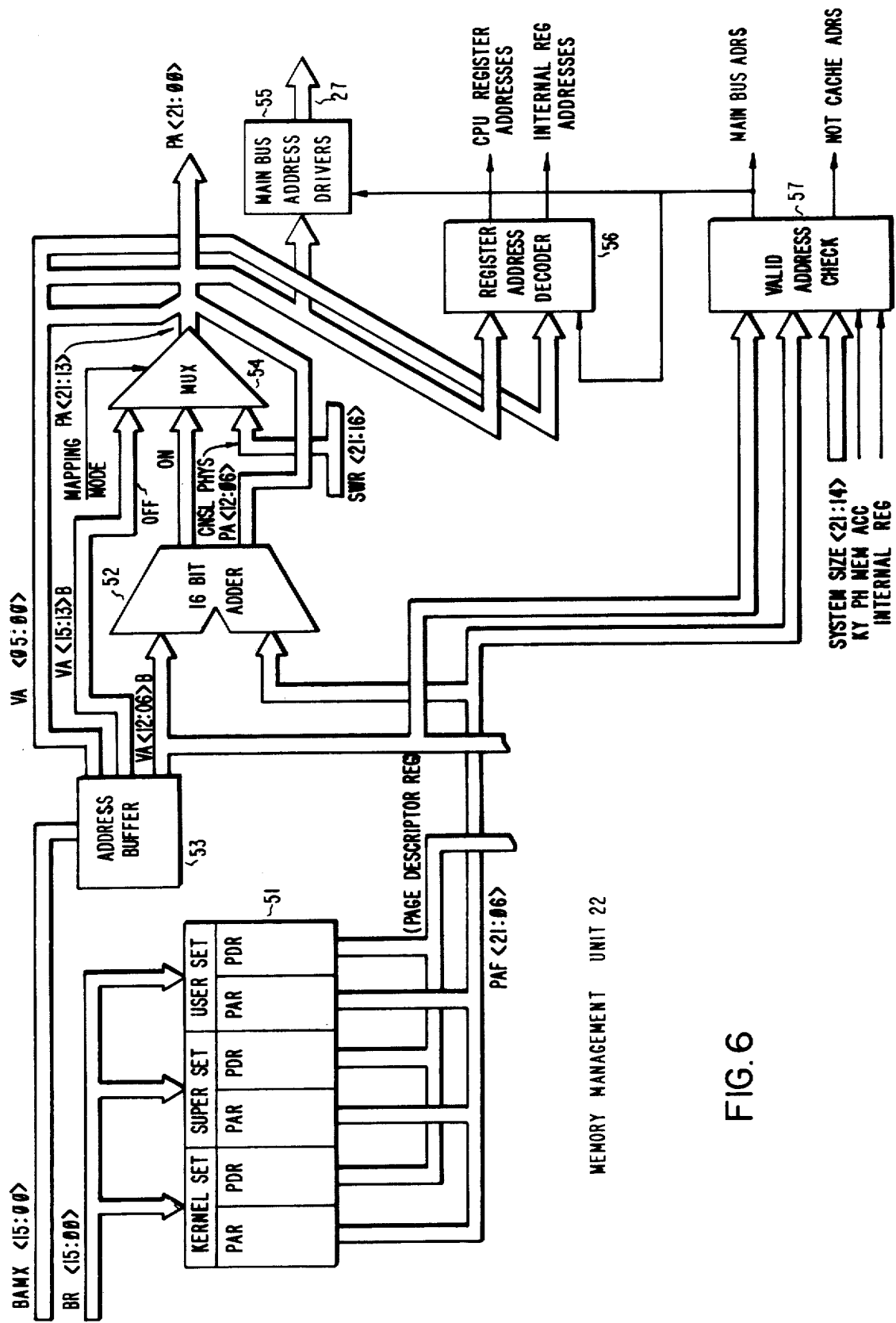
FIG. 6 is a block diagram of a memory management portion of the central processor shown in FIG. 1.

FIG. 6 illustrates one embodiment of the memory management unit 22 shown in FIG. 1 and described in detail in U.S. Pat. No. 3,854,126. The memory management unit contains page address (PAR) and page descriptor (PDR) registers 51. The three most significant bits of a 16-bit "virtual" address from a BAMX multiplexer are decoded to select one particular corresponding pair of page address and page descriptor registers. In a multiple-mode operating system which includes KERNAL, supervisor (SUPER) and USER, or other, modes, the register set has separate page address and page descriptor registers for each mode. Each page address register contains a 16-bit page address field which is coupled to an adder 52 on conductors having positional correspondence with bit positions 6 through 21 of the final address. An address buffer 53 stores the virtual address and provides therefrom signals on conductors having positional correspondence with bits 6 thorugh 12 as the other input to the adder 52. Bits 6 through 21 of the sum from adder 52 are concatenated with bits 0 through 5 of the output of a physical address multiplexer (MUX) 54, thereby to produce, during a 22-bit mapping mode represented by MAPPING MODE signals, the 22-bit address necessary to identify a particular memory unit location. Thus, the memory management unit 22 converts a 16-bit virtual address into a 22-bit physical address.

The memory management unit 22 also has other modes of operation which are controlled by the MAPPING MODE signals to the multiplexer 54. In one mode no mapping occurs, so the "virtual" address is not changed. In a second mode the "virtual" address is converted to an 18-bit address. These two modes correspond to the modes of operation of the unit described in U.S. Pat. No. 3,854,126.

The main bus drivers 55 couple address signals onto the main bus 27 in FIG. 1 in response to a MAIN BUS ADRS signal from a valid address check circuit 57. A register address decoder 56 also receives the address signals from the multiplexer 54 and asserts a CPU REG ADDRESSES signal that corresponds to the address of a processor register or INTERNAL REG ADDRESSES signals in response to the MAIN BUS ADRS signal from the valid address check circuit 57. The valid address check circuit 57 receives SYSTEM SIZE signals that define the size of the available memory, the page address field signals from the selected one of the registers in the set 51 and the intermediate or block number field from the virtual address. If the address designates a location that is not present in the associative memory, the valid address check circuit issues a NOT CACHE ADRS signal. As the operation of this memory management unit 22 is analogous to that of the unit described in the aforementioned U.S. Pat. No. 3,854,126, there is no further discussion of the operation of the unit shown in FIG. 6 or of other diagnostic portions that are described in that patent.

Operation of MAIN BUS MAP 23

Figure 7:
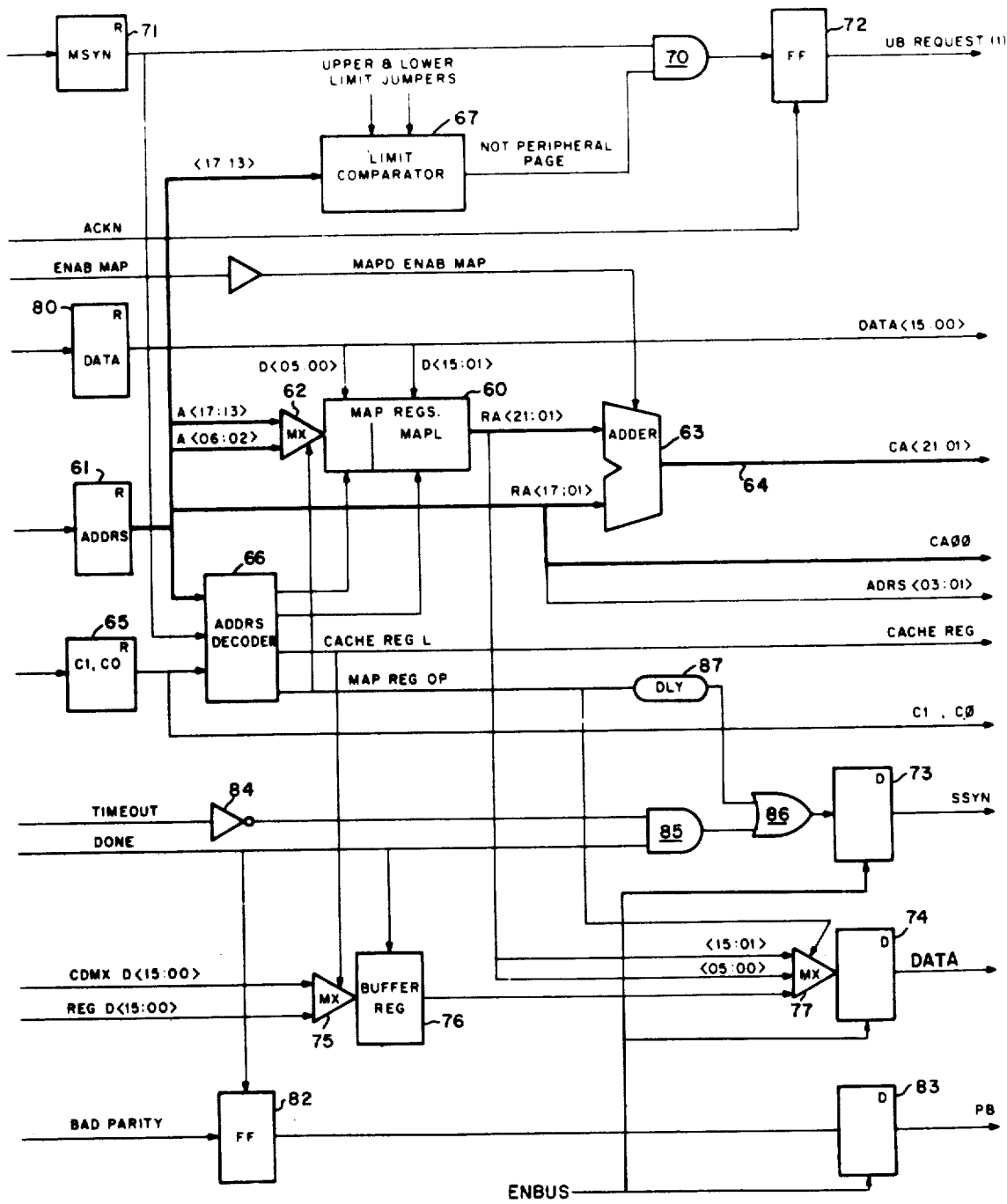
FIG. 7 is a block diagram of the main bus mapping circuit shown in FIG. 1.

As previously indicated, the main bus map 23 in FIG. 1 is an interface between the main bus 27 and the associative memory 24. In this system, the main bus map 23 acts as a "slave" device in response to signals on the main bus 27 and converts an 18-bit address found on the main bus to a 22-bit address for the bus 40. FIG. 7 is a detailed block diagram of the main bus map 23. The circuit contains a plurality of mapping registers 60 which provides an address relocation function. Each register 60 stores a base address and can be accessed individually over the main bus 27 in FIG. 1.

If there are 31 mapping registers, the five high-order address bits which are coupled from the main bus 27 by address receivers (ADRS) 61, are applied to a multiplexer 62 thereby to select a particular mapping register 60. The base address from the selected register 60 is then coupled to an adder 63 to be combined with the remaining low-order bits from the main bus address thereby to produce the twenty-two bit associative memory address on output conductors 64.

As previously indicated, the transfer through the main bus map 23 occurs in response to signals from a bus master. Initially the address signals are received by the ADDRS receivers 61; the C1 and C0 direction control signals by receivers 65. These signals are applied to an address decoder 66 and the high-order address signals are also applied to limit comparator 67.

Figure 18:
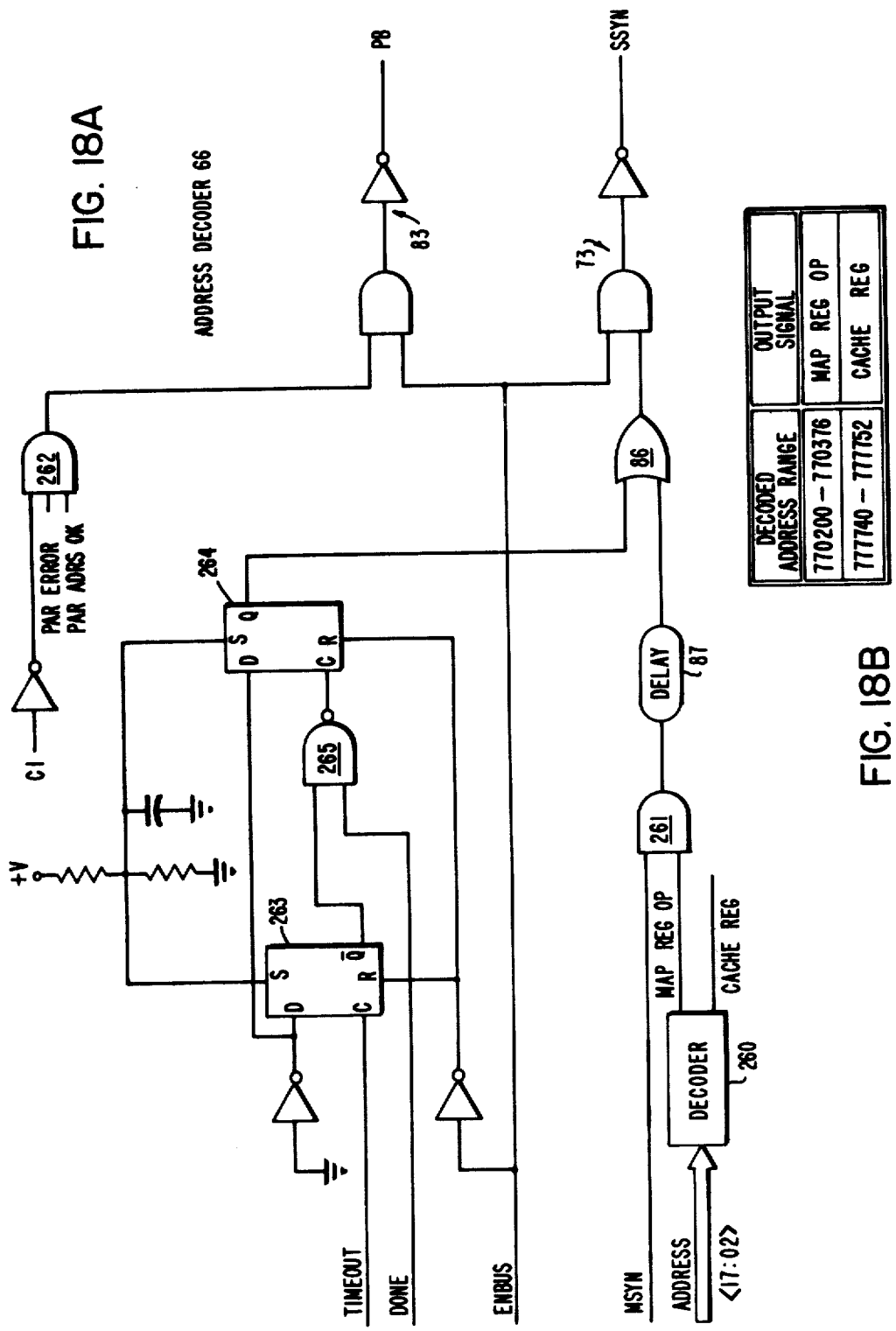
FIG. 18 is a detailed circuit diagram of an address decoder shown in FIG. 7 and includes FIGS. 18A and 18B.

FIG. 18A illustrates the address decoder 66 and other circuit elements shown of FIG. 7. FIG. 18B illustrates two typical address ranges which cause a decoder 260 in FIG. 18A to transmit MAP REG OP and CACHE REG signals. If the MAP REG OP signal is transmitted, a MSYN signal from the bus master energizes an AND gate 261, enabling a delay circuit 87 thereafter to energize an OR gate 86 and couple a SSYN signal through a driver 73, represented by an AND gate and inverter, in response to an ENBUS signal. In addition, the ENBUS signal enables a driver 83 to transmit a PB signal onto the bus if a parity error exists. This can occur when the C1 signal is not asserted, indicating a reading operation, an AND gate 262 then causing the driver 83 to transmit the PB signal if a PAR ERR signal and a PAR ADRS OK signal are asserted.

The ENBUS signal is transmitted simultaneously with a UB REQUEST signal (FIG. 7). In its nonasserted state, the ENBUS signal clears flip-flops 263 and 264. When the ENBUS signal is asserted, these overriding resetting signals are removed and the flip-flop 263 can be clocked to a set condition in response to a TIMEOUT signal. However, so long as the flip-flop 263 remains reset, it enables a NAND gate 265 to clock the flip-flop 264 to a set condition on the termination of a DONE signal. When the flip-flop 264 sets, it enables the OR gate 86 and thereby generates the SSYN signal.

Figure 19:
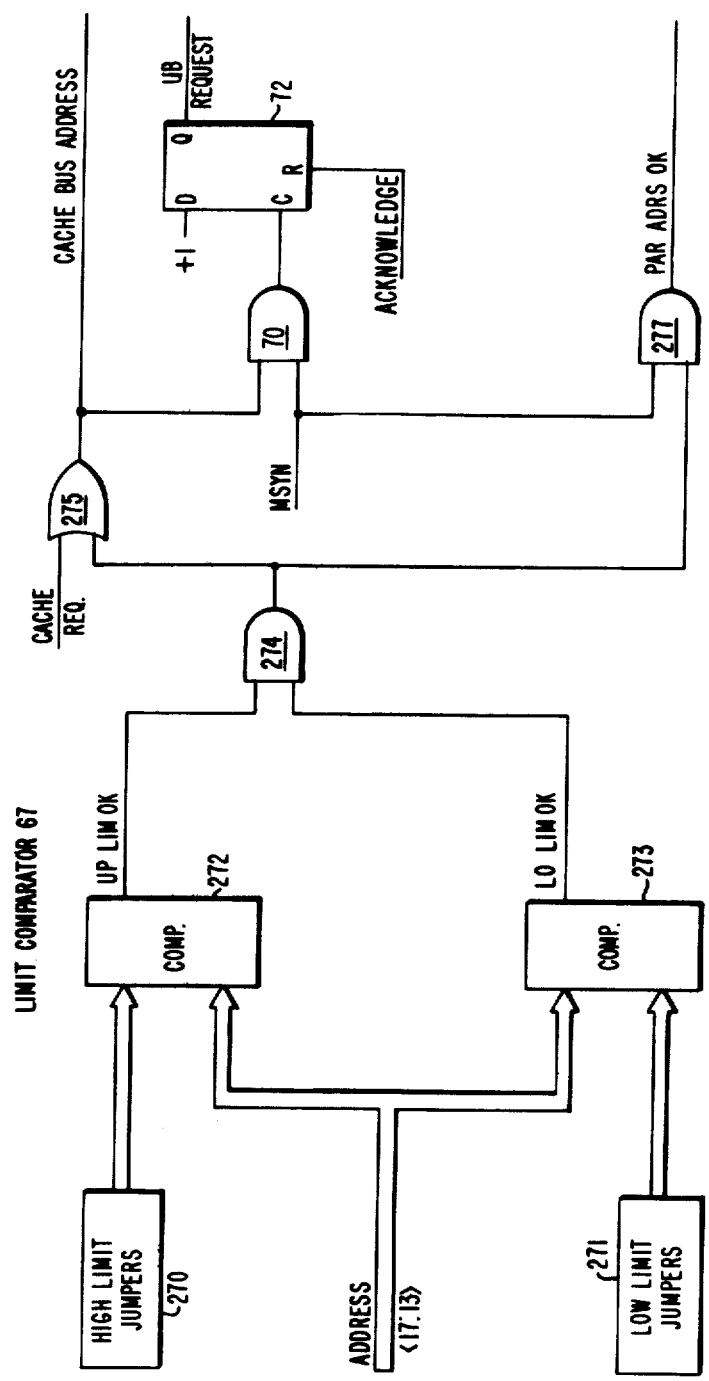
FIG. 19 is a detailed circuit description of a limit comparator circuit shown in FIG. 7.

FIG. 19 depicts the limit comparator 67. High limit jumpers 270 identify the highest address available to the mapping circuit; low limit jumpers 271, the lowest available address. Comparators 272 and 273, respectively, transmit UP LIM OK and LO LIM OK signals when a requested address is less than the upper limit and greater than the lower limit of the addresses to be mapped. If the requested address is within the limits, an AND gate 274 energizes an OR gate 275 to transmit a CACHE BUS ADDRESS signal and enable the AND gate 70. The AND gate 274 also enables an AND gate 277. When the MSYN signal thereafter is received, the AND gate 70 clocks the flip-flop 72 to a set condition and transmits the UB REQUEST signal (FIG. 7). The flip-flop 72 is cleared by an ACKNOWLEDGE signal from the main memory unit 29. The MSYN signal also enables the AND gate 277 to transmit the PAR ADRS OK signal that is applied to the AND gate 262 in FIG. 18A.

Referring again to FIG. 7, C1 and C0 signals from the receivers 65 indicate to the associative memory 24 (FIG. 1) the directon of an ensuing data transfer. When the transfer is to the bus 27, the data appears on CDMX conductors and is coupled through a multiplexer 75 into a buffer register 76 in response to a DONE signal. Another multiplexer 77 couples the data to drivers 74. During a transfer to the memory, the data is transmitted by the bus master before the MYSN signal is transmitted and is passed directly through receivers 80 to the associative memory 24 (FIG. 1).

Accordingly, the bus map circuit 23 in FIG. 7 converts the address signals from the main bus 27 (FIG. 1) to an address which uniquely identifies one location in the backup memory system 29. In addition, the main bus map contains the necessary buffers and circuitry to couple the data and interface the control signals necessary to communicate with the main bus 27 on one hand, and the associative memory 24 on the other hand.

Operation of ASSOCIATIVE MEMORY 24

Figure 8:
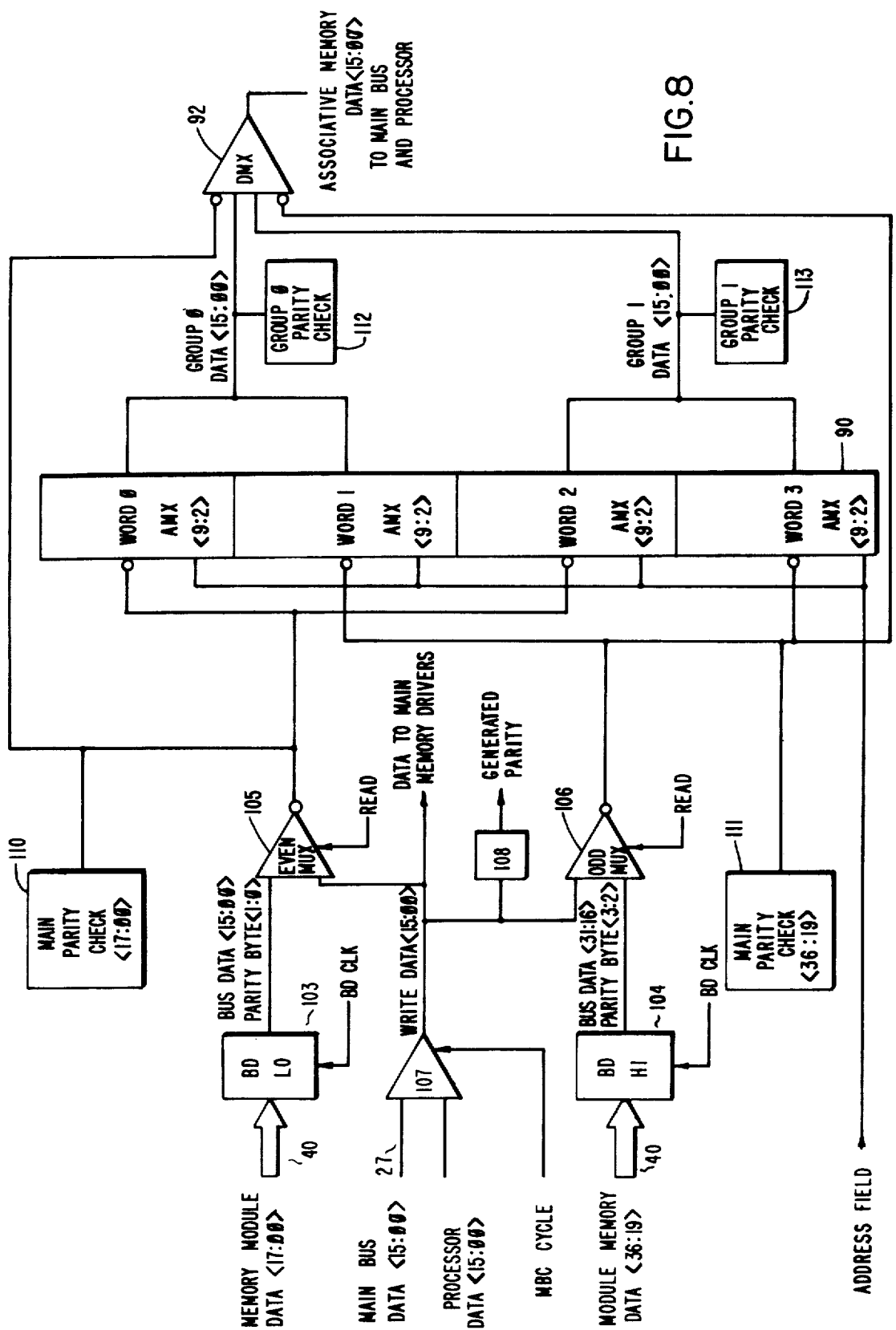
FIG. 8 is a block diagram of the associative memory shown in FIG. 1.

FIG. 8 depicts data paths in the associative memory 24 of FIG. 1. An associative memory is highly useful in this type of system because programs do not generate memory addresses randomly. Rather, they tend to access locations in the neighborhoods of locations that have been recently accessed. This phenomenon is generally known as the "principle of program locality". It can be understood by examining the small scale behavior of a typical program. In a program, code execution itself generally proceeds in straight lines or small loops. Thus, after each access, the next few memory accesses for instructions are most likely to be within a few words ahead or behind of that access. Moreover, a data stack tends to grow and shrink from one end, with the next few accesses of the stack being near the current top. Also character strings and vectors which are often scanned sequentially, usually occupy successive memory locations.

Although the principle of locality states how most programs tend to behave, it is not a law which all programs always obey. Branching, jump and other types of instructions oftentimes cause the operation to switch to a more remote area of the memory.

If an associative memory is to have a good probability of containing the words the program needs next, it should contain words whose memory locations are close to those recently accessed. In prior systems this has been accomplished by utilizing the previously described "block fetch" operation. When it is necessary to move a word of data from the random access memory units to the associative memory, an entire block of several adjacent words are moved at once from either preceding or succeeding locations. In such systems, the size of the block that is moved is critical. If it is too small, system performance suffers unless the programs contain many small loops. If the block is too large, there may not be sufficient room to enable adequate "look ahead" or "look behind" operations.

If an associative memory contains one contiguous block of locations, it will not operate optimally, because programs do reference other code segments, subroutines, stacks, lists and buffers that are located in scattered parts of the whole memory. Rather, it is preferred that the associative memory hold those words which are estimated as the most likely to be needed no matter how scattered those words are throughout the address space in main memory. Unfortunately, for this criterion to be fully satisfied, it is necessary to have an associative memory of substantial size. The time required to search the contents of the associative memory can then become unacceptably long.

At the opposite extreme, a direct-mapping associative memory requires only one address comparison. An address is separated into fields to provide a byte designation field, an index field and a byte address field. Conventionally, the direct-mapping associative memory uses the byte designation field to access a byte location. The index field specifies a block of locations. If the address field for a corresponding block in the address memory is the same as the received address field, the number in the byte field is used to identify a particular byte.

Figure 9:
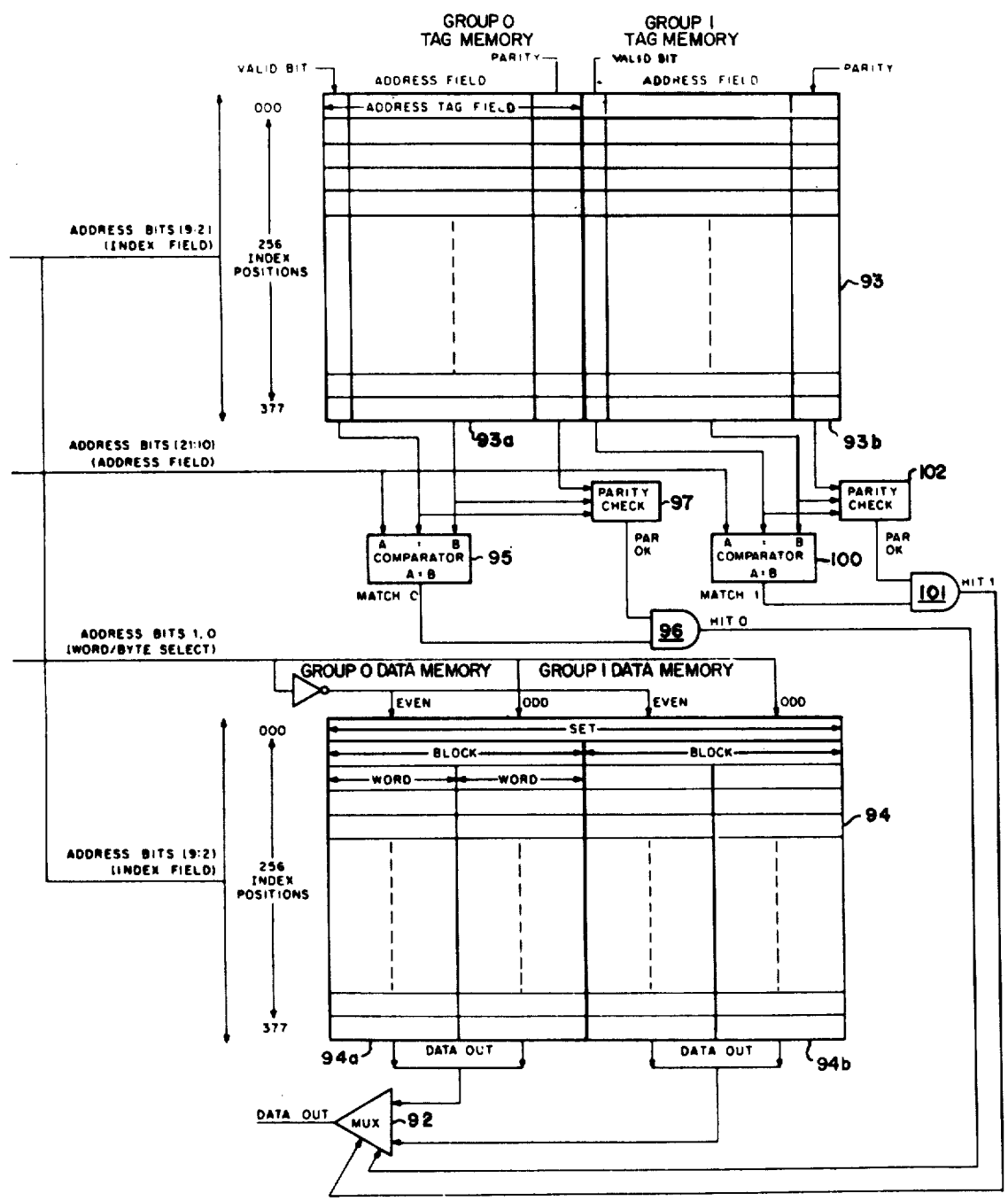
FIG. 9 is a detailed block diagram of portions of the associative memory shown in FIG. 8.

The associative memory in FIGS. 8 and 9 uses certain aspects of both direct-mapping and fully associative memories. In response to an incoming requested address, the associative memory uses a multibit index field (e.g., address bits 2 through 9) as a basis for selecting one of several locations within a memory module 90. The organization of the associative memory module 90 is shown in more detail in FIG. 9. It includes an address storage unit 93 and a data storage unit 94. For purposes of this explanation, each of the units 93 and 94 contains two separate groups. The unit 93 is divided into a GROUP 0 TAG MEMORY 93a and a GROUP 1 TAG MEMORY 93b; and the unit 94, into a GROUP 0 DATA MEMORY 94a and a GROUP 1 DATA MEMORY 94b. Each of the memories 93a, 93b, 94a and 94b contains 256 index positions that can be identified by the index field in an incoming address. Each of the two locations at each index position in the address storage unit 93 contains an ADDRESS TAG FIELD including a VALID-BIT position, an ADDRESS FIELD and a PARITY bit position that verifies that the ADDRESS TAG FIELD has been properly stored.

When an address is received, its index field is decoded to select one of the corresponding locations in each of the GROUP 0 and GROUP 1 TAG MEMORIES in the unit 93. A comparator 95 is enabled if the VALID bit in selected location in the GROUP 0 TAG MEMORY is asserted so as to enable a comparator 95 to compare the value of the ADDRESS FIELD from the GROUP 0 TAG MEMORY 93a and the address field from the incoming address. If there is a match, the comparator 95 transmits a MATCH 0 signal that enables an AND gate 96 to transmit a HIT 0 signal if a parity check circuit 97 transmits a PAR OK signal based upon the signals from the VALID bit position, ADDRESS FIELD and PARITY bit positions from the selected location.

In like fashion, a comparator circuit 100 enables an AND gate 101 to transmit a HIT 1 signal when the address field in the incoming address matches an ADDRESS FIELD from the GROUP 1 TAG MEMORY 93b and a parity check circuit 102 transmits a PAR OK signal.

Assuming that the associative memory unit 93 contains an ADDRESS FIELD which matches the address field in the incoming address, the corresponding HIT 0 or HIT 1 signal enables the multiplexer 92 in FIGS. 8 and 9 to pass the corresponding data from the associative memory unit 94. Specifically, the data is retrieved by addressing the unit 94 with the index field in the incoming address. Each pair of locations identified by the index field in the specific embodiment of the unit 94 shown in FIG. 9 contains four words. A pair of words is shown as constituting a block with a pair of blocks being stored at each index position. In this specific embodiment, bit 1 of the incoming address selects the high or low order word of each block and therefore provides two data words at the input to the multiplexer. As the blocks are retrieved from locations having the same index positions as the GROUP 0 and GROUP 1 TAG MEMORIES 93a and 94a, the HIT 0 and HIT 1 signals select the appropriate block from one of the data memories at the multiplexer 92 to provide the 16 bits of data requested by means of the incoming address. The data is passed on to the main bus map 23 and the central processor 21 in FIG. 1.

If the module 90 in FIG. 9 transmits neither the HIT 0 nor the HIT 1 signal, a "miss" condition exits, i.e., the contents of the location identified by the incoming address are not contained in the associative memory 24. In this circumstance, control circuitry associated with the memory 24 initiates a memory cycle in the back up memory system 29 (FIG. 1) to fetch an entire block (e.g., 2 data words) identified by certain high-order bits of the incoming address. In this particular embodiment, the block is identified by address bits 21 through 10. While the block is being retrieved from the backup memory system 29, the associative memory "decides" which of its own groups is to receive the incoming data.

When the data block arrives from the backup memory system 29, it is stored in the selected group of the associative memory unit 94 and, at the same time, the word in the memory location identified by the incoming address is passed along to the central processor 21 or to the main bus 27 through the main bus map 23 (FIG. 1). Simultaneously, the address of the main memory location from which the data was retrieved is loaded into the corresponding location in the TAG MEMORY 93 along with a set "VALID" bit.

During a writing operation initiated either by the central processor 21 or another unit connected to a main bus 27, the initial sequence of the associative memory 24 is the same as a reading operation. The address unit 93 is accessed. If the address fields match and the corresponding VALID bit is set, i.e., a "hit" is indicated, the new data is written into the appropriate word or byte of the associative memory unit 94, based upon the appropriate index position and byte fields of the address. The associative memory 24 also causes the new data to be written into the corresponding location in one of the memory modules 30 through 33.

If no "hit" is indicated during such a writing operation, a write cycle is performed at the specified address in the backup memory system, but no changes are made in the associative memory 24.

DATA PATHS

Referring to both FIGS. 1 and 9, as previously indicated, it is also possible to transfer data from the backup memory system 29 through the associative memory 24 and one of the high speed controllers 34 or 36, to a secondary storage device. Conversely during a writing operation, data is transferred directly through the associative memory 24 to the appropriate one of the memory modules 30 through 33 identified by the address from the high speed controller. During such a writing operation, however, each address is also sent to the TAG MEMORY unit 93 in the memory 24. If a "hit" is detected during any such transfer, the corresponding "VALID" bit is cleared and the PARITY bit is altered. During a memory reading operation involving a secondary storage device, transfers are made directly from the designated locations in the backup memory system 29 to the appropriate high speed controller.

The foregoing operation will be more readily comprehended by referring again to FIG. 8, which depicts the data paths through the associative memory 24. Latches 103 and 104 respond to an internal BD CLK pulse to load data from the bus 40 when data is being transferred from the backup memory system 29 and provide inputs to multiplexers 105 and 106 respectively. During such a reading operation, this information is coupled through the multiplexers 105 and 106 to appropriate locations in the module 90 defined by the ADDRESS FIELD bits. During a writing operation, data from the main bus 27 or the central processor 21 is coupled to a multiplexer 107. If it comes from the processor (identified when an MBC CYCLE signal is inactive) the processor data is passed by the multiplexer 107 to the backup memory system 29 and to the multiplexers 105 and 106, thereby to be loaded into the appropriate location If the data appears on the main bus 27, then the MBC CYCLE signal is active; and the main bus data passes through the multiplexer 107 to be loaded into the module 90 along with a GENERATED PARITY signal produced by a circuit 108. During reading operations from the backup memory system 29, main parity checking circuits 110 and 111 determine whether any parity errors exist. Likewise, a GROUP 0 parity checking circuit 112 and a GROUP 1 parity checking circuit 113 monitor data that is transmitted from the module 90 in order to detect any parity errors. These parity checking operations further insure the integrity of the data as it passes through the associative memory.

Operation of THE BACKUP MEMORY SYSTEM 29

Control and Timing Circuit

As previously stated, whenever it is necessary to transfer data between the associative memory 24 and backup memory system 29, a control portion of the associative memory and an addressed one of the memory modules 30 through 33 interchange signals to effect a data transfer. The circuits involved are shown in FIG. 10, wherein 10A illustrates the circuitry for transmitting the various control signals. More specifically, a decoder 110A has two separate sets of inputs which receive selection signals indicating which of the possible sources are providing the input information to the associative memory 24. These sources may include the central processor 21, the main bus map 23 or one of the high speed controllers 34 or 36. In response, the decoder 110A couples to a byte mask encoder 112A the selected C1 or C0 signal, the C1 signal also being active to produce a reading operation. The C1 and C0 signals from the decoder 110A also are coupled onto the bus 40.

Figures 10A, 10B:
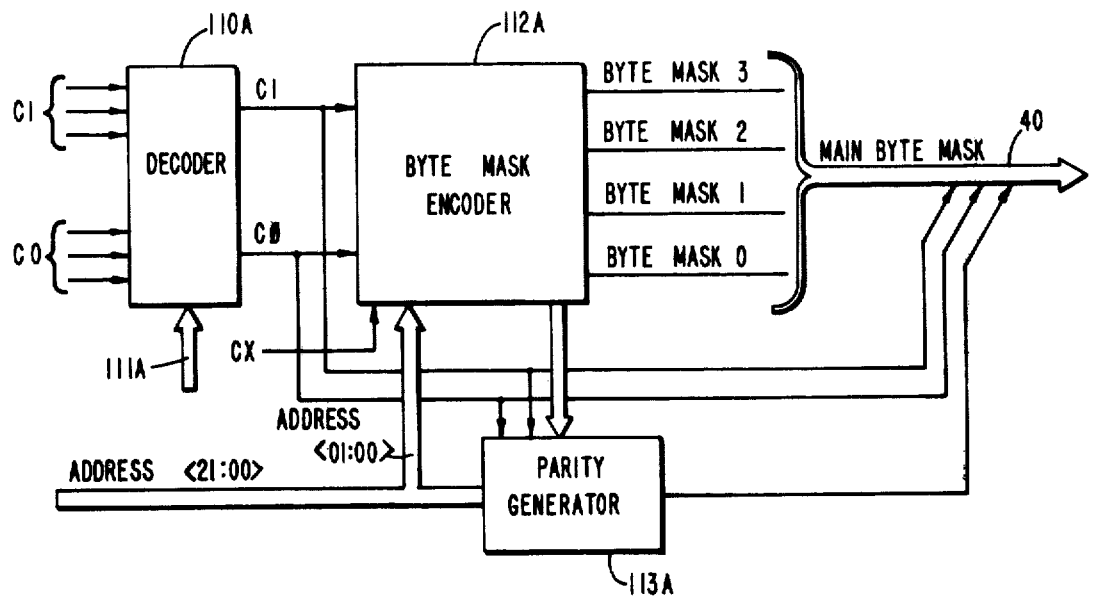
FIG. 10 is a detailed block diagram of a portion of the control circuitry for the associative memory in FIG. 8 and includes FIGS. 10A, 10B and 10C.

The byte mask encoder 112A receives, in addition to the C0 and C1 signals, the least two significant bits of the address and a CX signal that indicates that a double-word writing cycle is to be performed by one of the high speed controllers. In response, the encoder 112A produces four byte mask signals which also are coupled onto the bus 40. FIG. 10B tabulates the operations encoded by encoder 112A and the values of the corresponding byte mask signals for each set of input conditions. In addition, a parity generator 113A receives the address signals, the C0 and C1 signals, the byte mask signals and other signals thereby to produce a parity signal which also is coupled onto the bus 40.

Figure 10C:
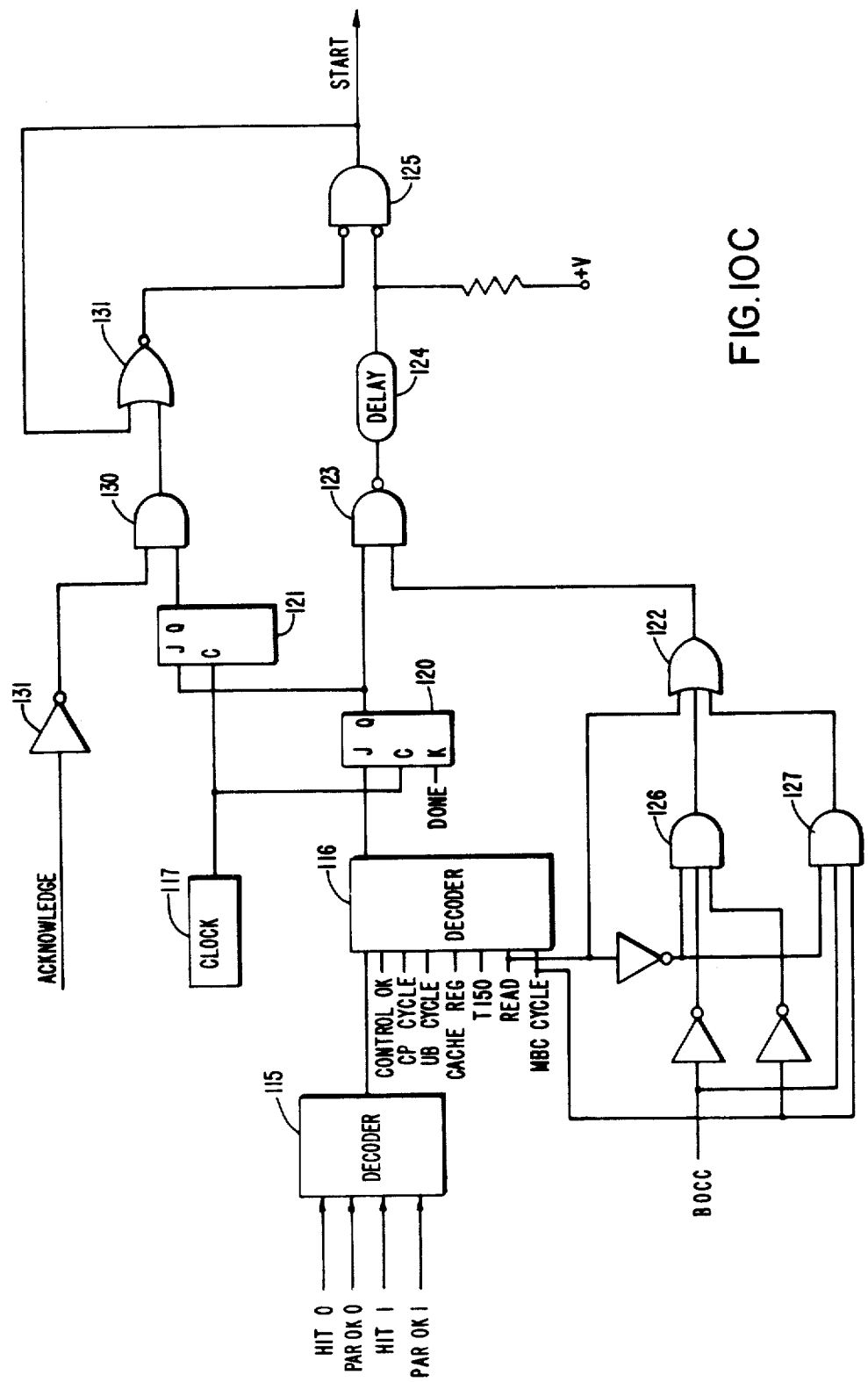

The remaining signal transmitted by the associative memory 24 is the START signal. As shown in FIG. 10C, decoders 115 and 116 establish the conditions under which a free-running clock 117 can clock, in succession, flip-flops 120 and 121 to their respective set states. A T150 signal controls the timing so it is only while the T150 signal is active that the flip-flop 120 can be set. The other input signals to the decoders 115 and 116 further define those conditions. For example, during a transfer to or from a secondary storage facility, the MBC CYCLE signal is active and the decoder 116 enables the flip-flop 120 to set. Another condition is a transfer to the memory over the main bus, so long as an internal register in the associative memory is not involved. The START signal is also enabled during a transfer to the backup memory system from the central processor. Moreover, the START signal is generated if either the HIT 0 or HIT 1 signal is inactive or if the PAR OK 0 or PAR OK 1 signal is inactive. These signals indicate that data is invalid, as previously described, and control the START signal during a reading operation to the central processor or the main bus. Any time the flip-flops 120 and 121 are set, an OR gate 122 can energize a NAND gate 123. The NAND gate 123 generates a ground assertion signal that passes through a delay circuit 124 and energizes a NOT AND gate 125, thereby to transmit the START signal. The OR gate 122 is energized in response to any one of three conditions. First, during any reading cycle a READ signal energizes the OR gate 122. Secondly, during a writing cycle an AND gate 126 energizes the OR gate 122 so long as the BOCC signal and an MBC CYCLE signal are not asserted. The MBC CYCLE signal is asserted when the transfer involves one of the high speed controllers 34 or 36 in FIG. 1. The OR gate 122 is also energized by an AND gate 127 during a writing cycle even if the internal memory bus 40 is occupied, provided the MBC CYCLE signal is asserted.

When the flip-flop 121 sets, it energizes an AND gate 130 that is enabled by an inverter 131 so long as the ACKNOWLEDGE signal from the internal bus 40 is not asserted. As a result, the AND gate 130 energizes a NOR gate 131, thereby to enable the NOT AND gate 125. The START signal is fed back to the second input to the NOR gate 131 to latch the START signal to an asserted level. When the ACKNOWLEDGE signal is asserted, the inverter 131 disables the AND gate 130. When a transfer is completed from the associative memory 24, the DONE signal is asserted at the K input of the flip-flop 120. The next two successive clock pulses then reset the flip-flops 120 and 121 in succession. After an interval determined by the delay circuit 124, the NOT AND gate 125 is then de-energized and the START signal terminates.

Accordingly, FIGS. 10A and 10B show the circuits within the associative memory that generate the various control signals to the backup memory system 29 and that receive the control signals from that system.

Figure 11:
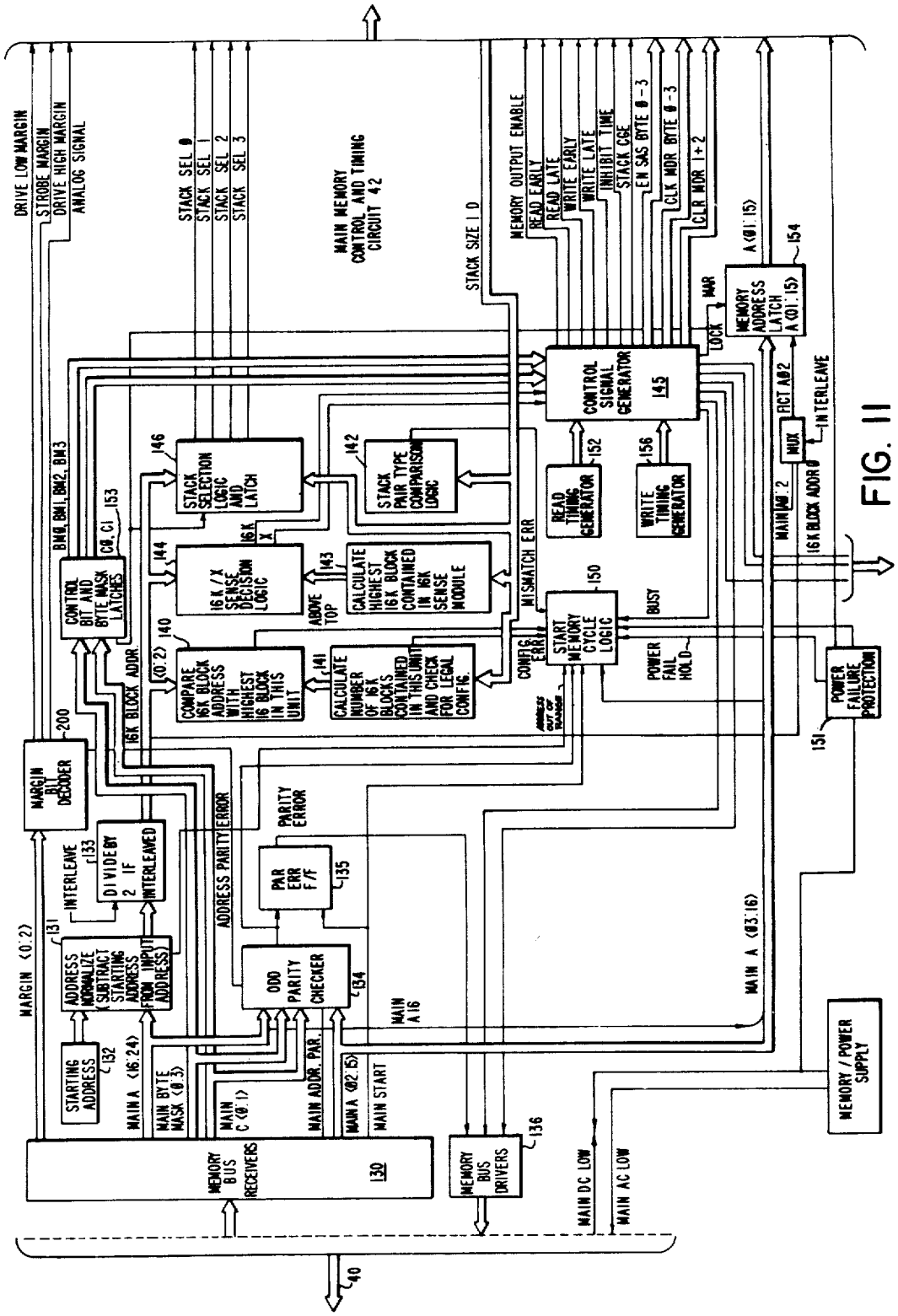
FIG. 11 illustrates a memory controller used in a memory module shown in FIG. 1.

FIG. 11 illustrates a main memory control and timing circuit 42 in one of the main memory modules 30 through 33 of FIG. 1. Memory bus receivers 130A receive signals from the internal memory bus 40 and any one of the memory modules 30 through 33 (FIG. 1). When address signals are received on the bus 40, the nine most significant bits are applied to an arithmetic unit 131A to be normalized by subtracting from the bits a value corresponding to the value of the starting address for the memory unit. This value is provided by a switch or jumper circuit identified as a starting address circuit 132. If there is a negative difference in the most significant bits, or if the address is greater than any address in the memory unit, the address normalizing circuit 131A transmits an ADDRESS OUT OF RANGE signal and terminates any further operation within that particular memory unit. Otherwise the four least significant bits of the difference are coupled to a dividing circuit 133 which, if interleaving operations are enabled, divides the resulting signal by two thereby to produce a 3-bit block address to specify one of eight potential blocks in the various stacks in the corresponding memory module.

An odd parity checker 134 receives the address signals, the byte mask signals, the C0 and C1 signals and address parity signal from the memory bus receivers 130A. If the parity is incorrect, a parity error flip-flop 135 is set in response to the START signal thereby to couple a PARITY ERROR signal through memory bus drivers 136. Moreover, an ADDRESS PARITY ERROR signal from the parity checker 134 disables further operations within the memory unit.

Still referring to FIG. 11, the block address signals from the divider 133 are coupled to address analysis circuitry thereby to determine whether further operations are possible based on the characteristics of the particular memory stack which has been selected. In a comparison circuit 140, the block address is compared with signals from a circuit 141 that indicate the number of potential blocks contained in the memory unit. This number is based upon the STACK SIZE ID signals that are received from the various modules. Circuit 141 also verifies that the units are in a correct orientation and transmits a CONFIG ERR signal if they are not. The circuit 141 is basically a read-only memory which transmits a digital number to the comparison circuit 140 but also transmits the CONFIG ERR signal if the STACK SIZE ID signals do not correspond to a recognized valid configuration value contained therein. If the incoming address identifies a block number which is greater than the available block numbers in the memory serviced by the circuitry in FIG. 11, the comparison circuit 140 transmits an ABOVE TOP error signal. A stack pair type comparison logic circuit 142 monitors the STACK SIZE ID signals from each of the corresponding stacks in a pair to assure that stacks operating in parallel have the same characteristics. If they do not, the circuit 142 transmits a MISMATCH ERR signal.

In this particular embodiment, the STACK SIZE ID signals can identify blocks of data in the memory unit stacks which have two different characteristics. A circuit 143 receives the STACK SIZE ID signals and calculates the highest 16K-word block contained in the module. These signals are coupled to a 16K/X decision logic circuit 144 which compares the block address in the number from the unit 143 and the incoming address (i.e. selected bits from the circuit 133) thereby to determine whether the particular address lies in a 16K-word stack having one set of characteristics or a stack with the other characteristics designated by the X signal. The output of this decision logic circuit 144 is coupled to a control signal generator 145. A stack selection logic and stack selection latch circuit 146 also receives the STACK SIZE ID signal and the BLOCK ADDRESS signals, thereby to identify the particular one of the stacks, such as low and high stacks 43 and 44 shown in FIG. 1, that contain the addressed location.

The main START signal causes the start memory cycle logic 150 to transmit a START DELAY signal, assuming that no errors exist and that the control signal generator 145 does not assert a BUSY signal indicating that the memory unit already is executing a memory cycle. Also it is assumed that a power failure protection circuit 151 transmits neither a POWER FAIL HOLD nor a RESET signal. The START DELAY signal energizes a read timing generator 152 which operates like a Johnston-type counter to provide a sequence of timing signals to the control signal generator 145.

One of the first signals thereupon transmitted by the control signal generator 145 is a LOCK MAR signal. This signal is coupled to a latching circuit 153 to latch the byte mask bits and C0 and C1 bits from the receivers 130. It also enables the stack selection logic and stack select latch 146 to latch the stack selection circuit. In addition, a memory address latch circuit 154 latches low-order address bits including either the A02 bit from a multiplexer 155, if interleaving operations are disabled, or the low-order block address signals if interleaving operations are enabled.

As described in more detail later, the read-timing generator 152 transmits RT1 through RTi signals in sequence. When the control signal generator 145 transmits a START WRITE signal, a write timing generator 156, which also is a Johnston-type counter, transmits WT0 through WTi signals in sequence to the control signal generator 145.

As a result, the control signal generator 145 transmits all the necessary signals to the individual stacks to enable a reading or writing operation. Also as described in more detail later, other signals control the transfer of data to or from the associative memory 24.

Figure 12:
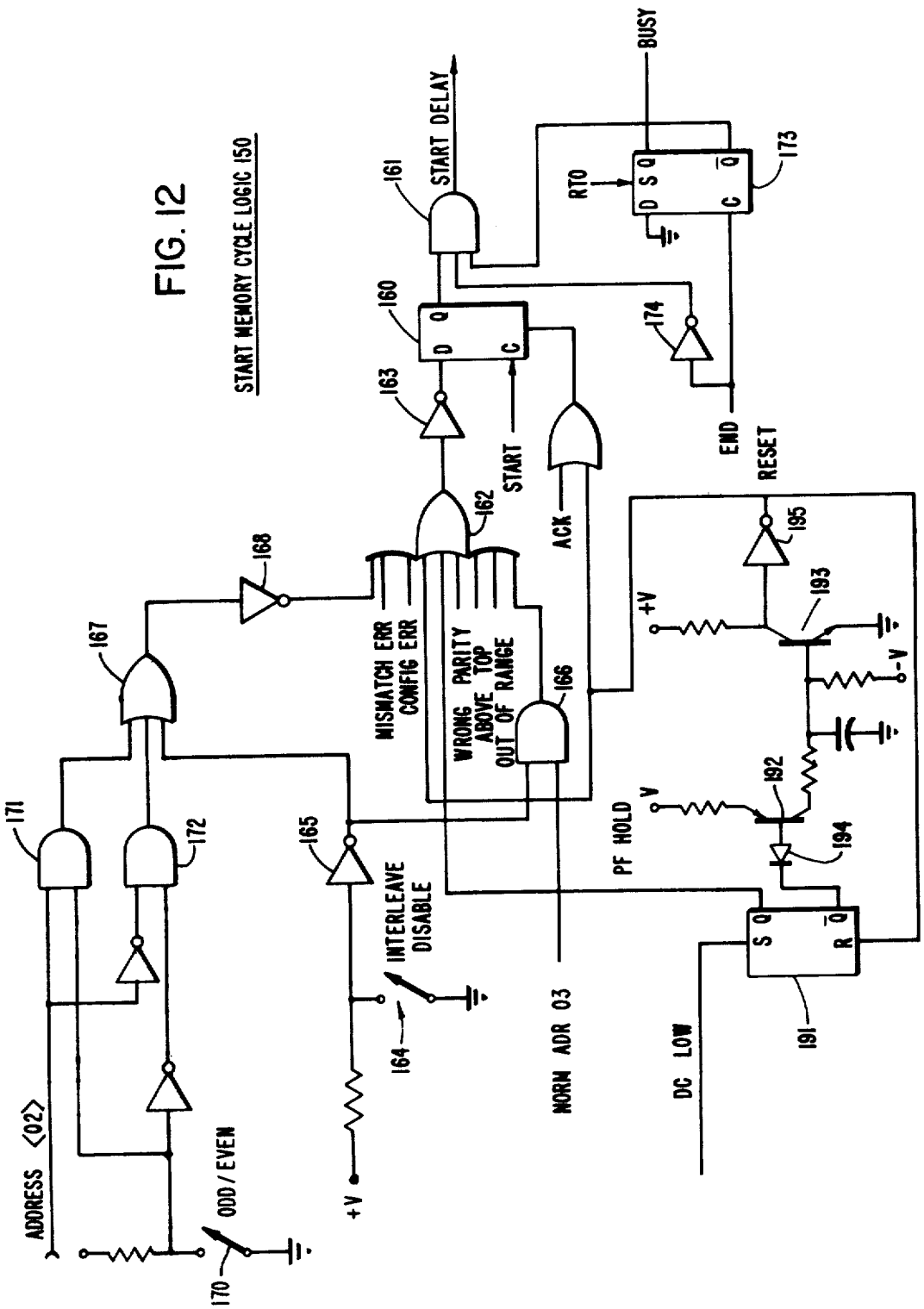
FIG. 12 is a detailed circuit diagram of start memory circuit shown in FIG. 11.

FIG. 12 illustrates the start memory cycle logic 150 of FIG. 11. A flip-flop 160 normally energizes an AND gate 161 to transmit the START DELAY signal which energizes the read timing generator 152 in FIG. 11. If an OR gate 162, that receives all the potential error signals, is energized, an inverter 163 prevents the flip-flop 160 from setting in response to the START signal and thereby inhibits the START DELAY signal. As can be seen in FIG. 12, the OR gate 162 receives the error signals plus a RESET signal and a PF HOLD signal.

With further reference to FIG. 12, an interleave disable switch 164 is open when interleaving operations are to occur. Thus, during interleaving operations, an inverter 165 produces a ground assertion output signal that disables an AND gate 166, so that the energization of the OR circuit 162 depends upon the other circuit elements in the system. When interleaving is enabled, a switch 170 in one memory module will be closed, thereby to designate odd addresses and, as shown in FIG. 12, the switch 170 will be open in the memory module that contains even addresses. For the even memory module which is indicated in FIG. 12, the switch 170 enables an AND gate 171 and disables an AND gate 172. Whenever the ADDRESS(02) bit position in an address contains a ONE, it designates an even address and the AND gate 171 then energizes the OR gate 167. When this condition exists, the inverter 168 does not provide an energizing input to the OR gate 162. Conversely, in the odd address memory unit, the AND gate 172 will energize the OR gate 167 if the ADDRESS(02) bit is a ONE.

When the START DELAY signal is transmitted, the read timing generator 152 (FIG. 11) immediately transmits an RT0 signal which sets a flip-flop 173 through its preset input terminal. The flip-flop 173 thus transmits the BUSY signal and disables the AND gate 161 thereby to terminate the START DELAY signal. Once this operation begins, it continues until the control signal generator 145 (FIG. 11) transmits an END signal. An inverter 174 in FIG. 12 receives the END signal and, when that signal is inactive, enables the AND gate 161. When, at the end of its operation, the control signal generator 145 transmits the END signal, the gate 161 is disabled; also the flip-flop 173 is reset, thereby terminating the BUSY signal. When the END signal terminates, the AND gate 161 is again enabled to generate a START DELAY signal. If a prior attempt has been made to begin a memory operation with the memory unit, the flip-flop 173 will be in the set condition and thus will transmit the START DELAY signal immediately.

Figure 13:
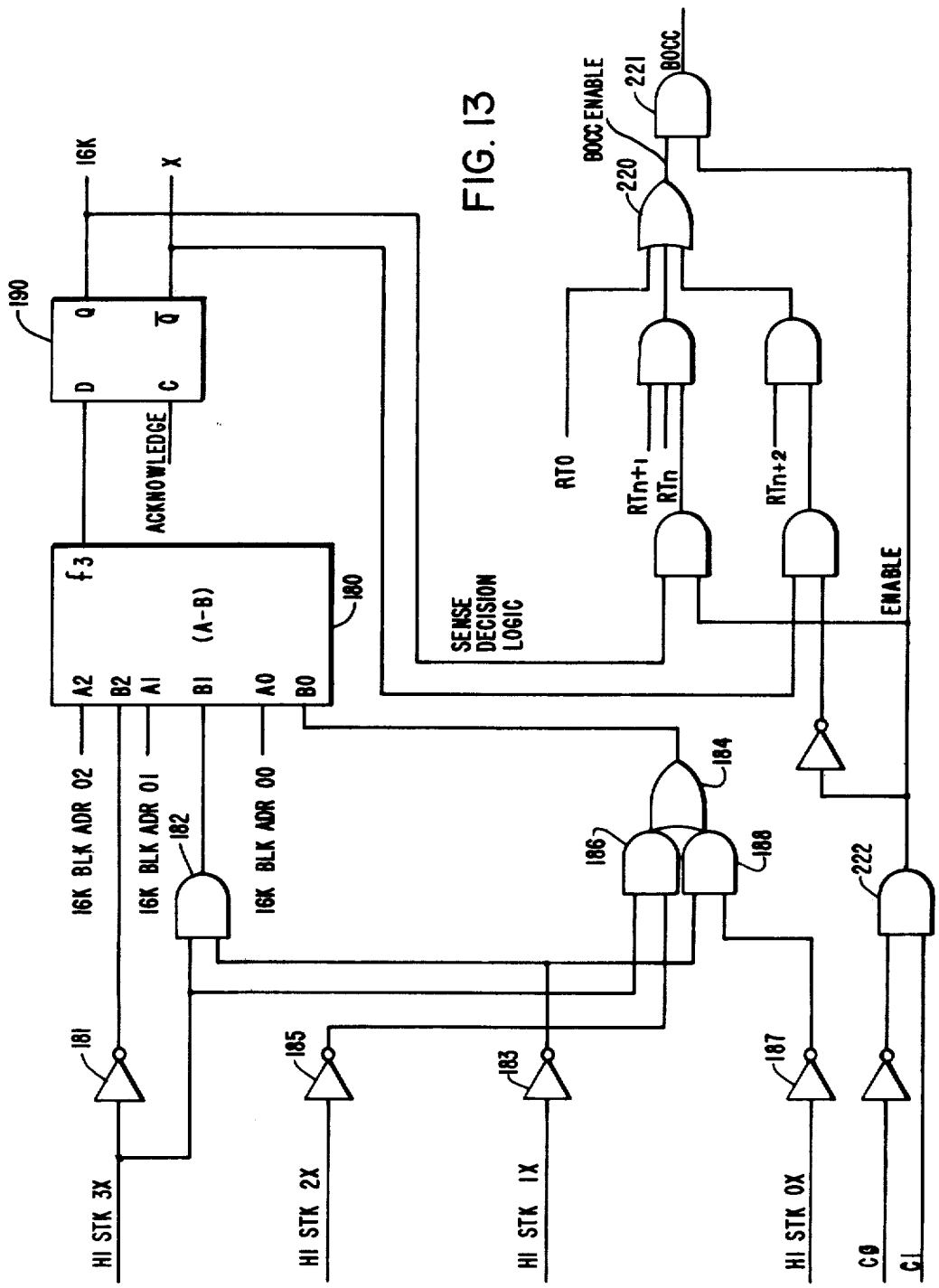
FIG. 13 is a detailed circuit schematic of a sense decision circuit shown in FIG. 11.

As previously indicated, the backup memory system 29 (FIG. 1) may comprise stacks having diverse characteristics. FIG. 13 shows a circuit for sensing whether a particular stack being addressed contains a memory with one characteristic or the other. The 16K BLK ADR(00–02) signals are applied to the A0–A2 inputs, respectively, of an arithmetic and logic unit 180. The other inputs include HI STK 0X through HI STK 3X signals, which are provided by the individual high stacks. These signals indicate whether the individual stacks have the characteristics of 16K size stack. Each stack contains a jumper or other means for permanently transmitting that signal. If stack "3" has the 16 K size characteristics, an inverter 181 produces a ONE at the B2 input of the logic unit 180. If stack "3" has the alternate characteristics an AND gate 182 produces a ONE at the B1 input so long as high stack "1" has the 16 K size characteristic, as indicated by a signal from an inverter 183. The B0 input to the arithmetic and logic unit 180 is provided by an OR gate 184. The B0 input signal receives B1 if stack "3" has the alternate characteristics and stack "2" has the 16 K size characteristics, in which case an inverter 185 energizes an AND gate 186 and the OR gate 184. If both stack "1" and stack "0" have the 16K size characteristic, inverters 183 and 187 energize an AND gate 188 thereby to energize the OR gate 184.

Each time the memory transmits the ACKNOWLEDGE signal, it clocks a flip-flop 190 to a set condition if the most significant bit of the remainder (i.e., the digital value at the B inputs minus the digital value at the A inputs) at the f3 output of the logic unit 180 contains a ONE. In this situation, the flip-flop 190 transmit the 16 K signal; otherwise it transmits the X signal. Thus, the sense decision logic 144 provides either a 16 K or an X output signal.

FIG. 12 also shows the circuitry for generating the PF HOLD and reset signals which are applied to the OR gate 162. Whenever the DC supply voltage drops below a safe level, appropriate circuitry transmits a DC LOW signal which sets a latch 191. This transmits the PF HOLD signal. In addition, a network comprising transistors 192 and 193 and a diode 194 holds the input to an inverter 195 at a ground level, so the inverter 195 generates the RESET signal when the DC LOW signal terminates.

Each of the stacks shown in FIG. 1 comprises XY coordinate drivers, sense-inhibit circuits and the memory units which contain the cores and is a conventional coincident-current magnetic core memory. The XY driver circuits decode the address signals to select a particular string of cores. Each sense-inhibit circuit connects to a winding which is threaded through cores in parallel with the Y current winding. As known, and X and Y currents are passed through the cores in the direction that will switch the cores from a ONE magnetic state to a ZERO magnetic state and the resulting change in magnetic field induces a voltage in the sense-inhibit winding. This voltage is detected and amplified by a sense amplifier to transmit a ONE if the core state changes. Otherwise, no voltage is induced in the sense-inhibit winding and the corresponding register bit is not set. Such a reading operation is known as a destructive reading operation because the state in the cores which have been sensed are in the ZERO state at the completion of the operation.

In order to write data into a core, the core is initially switched to a zero state by performing a destructive reading operation. The X and Y currents are then switched through the core in the direction that will switch the core from the ZERO magnetic state to a ONE magnetic state. If a ZERO is to be written into the core, an inhibit current is driven through the sense-inhibit winding and this induces a magnetic field having the opposite polarity to the field induced by the X and Y currents, so the core remains at the ZERO state. The circuits which transmit these signals and the necessary timing signals are basically analog.

Margin Control Signals

Referring again to FIG. 11, a margin bit decoder circuit 200 receives MARGIN bits from the bus 40 and produces various signals which can alter the operation of these analog signals. For example, if the margin bits all have a zero value, the system operates at normal timing and current levels. If the MAIN MARGIN (1) bit is asserted, the value of a STROBE MARGIN analog signal is shifted to delay strobe pulses. More specifically, when the MARGIN 1 bit is asserted, the STROBE MARGIN signal goes from a normal value of +2.5 volts to 0 volts and causes each memory strobe pulse to be generated earlier than normal.

Figure 14:
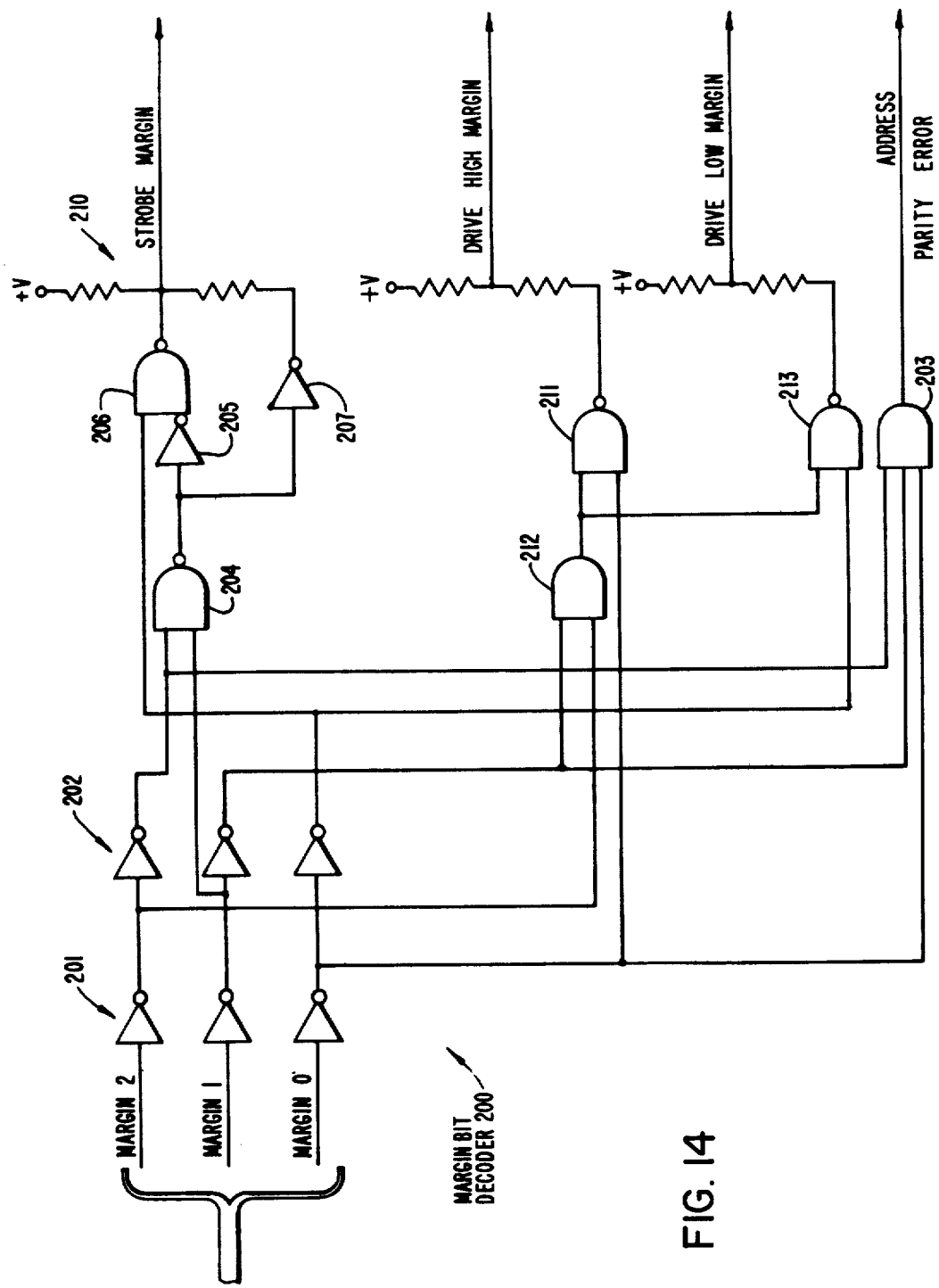
FIG. 14 is a detailed circuit schematic of a margin decoding circuit in FIG. 11.

In FIG. 14, the margin bit decoder 200 is shown in detail. An array of inverters 201 and another array of inverters 202 provide positive and ground assertion levels, respectively, for the margin signals. When the margin signals are all at a nonasserted level, the STROBE MARGIN, DRIVE HIGH MARGIN and DRIVE LOW MARGIN signals are at normal levels. In addition, an AND gate 203 is de-energized. If only the MARGIN 0 bit is asserted, a special code exists and the AND gate 203 then produces the ADDRESS PARITY ERROR signal, which is coupled back to the parity checker 104 in FIG. 11. If the strobe pulses that determine the time that data latches monitor the sense windings are late, then the MARGIN signals are sent in which the MARGIN 1 bit only is asserted. When this occurs, a NAND gate 204, which was energized, is de-energized and an inverter 205 energizes a NAND gate 206, thereby shifting the STROBE MARGIN signal to ground potential and causing strobe pulses to occur earlier than normal by a fixed amount. If both the MARGIN 1 and MARGIN 2 bits are asserted, the outputs of the NAND gate 206 and an inverter 207 both shift to a positive potential thereby to shift the STROBE MARGIN signal to a voltage of approximately +5 volts. This delays the generation of the sense amplifier strobe pulses until a fixed interval after the normal time.

The X and Y currents can be increased by energizing a NAND gate 211. This occurs when the MARGIN 0 and 2 bits are asserted and the MARGIN 1 bit is not asserted. With this condition an AND gate 212 enables the MARGIN 0 bit to energize an AND gate 211 and thereby reduce the analog voltage level of the DRIVE HIGH MARGIN signal. Likewise, if only the MARGIN 2 bit is asserted, the AND gate 212 enables a NAND gate 213 to be energized by the MARGIN 0 bit, thereby to shift the DRIVE LOW MARGIN signal to a low value and reduce the X and Y current.

With the thus-described structure of a memory module in mind, we shall now discuss in detail the three typical transfer operations which occur between the associative memory 24 and allocation in a memory module.

Reading Operation

Figure 15:
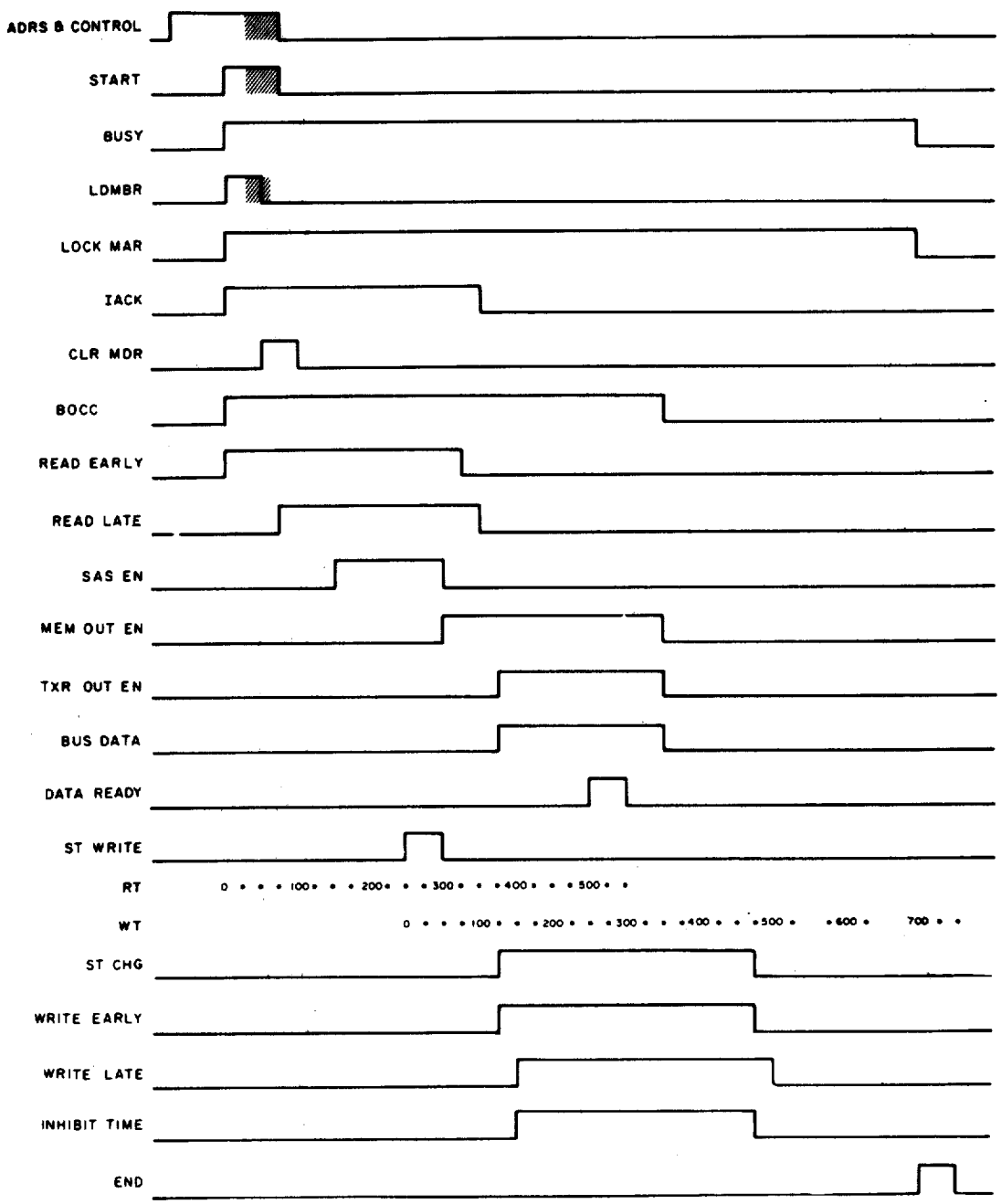
FIG. 15 is a detailed timing diagram that illustrates the timing signals that are transferred between a memory controller and a memory stack in FIG. 11 during a transfer from the memory module to the associative memory.
Figure 20:
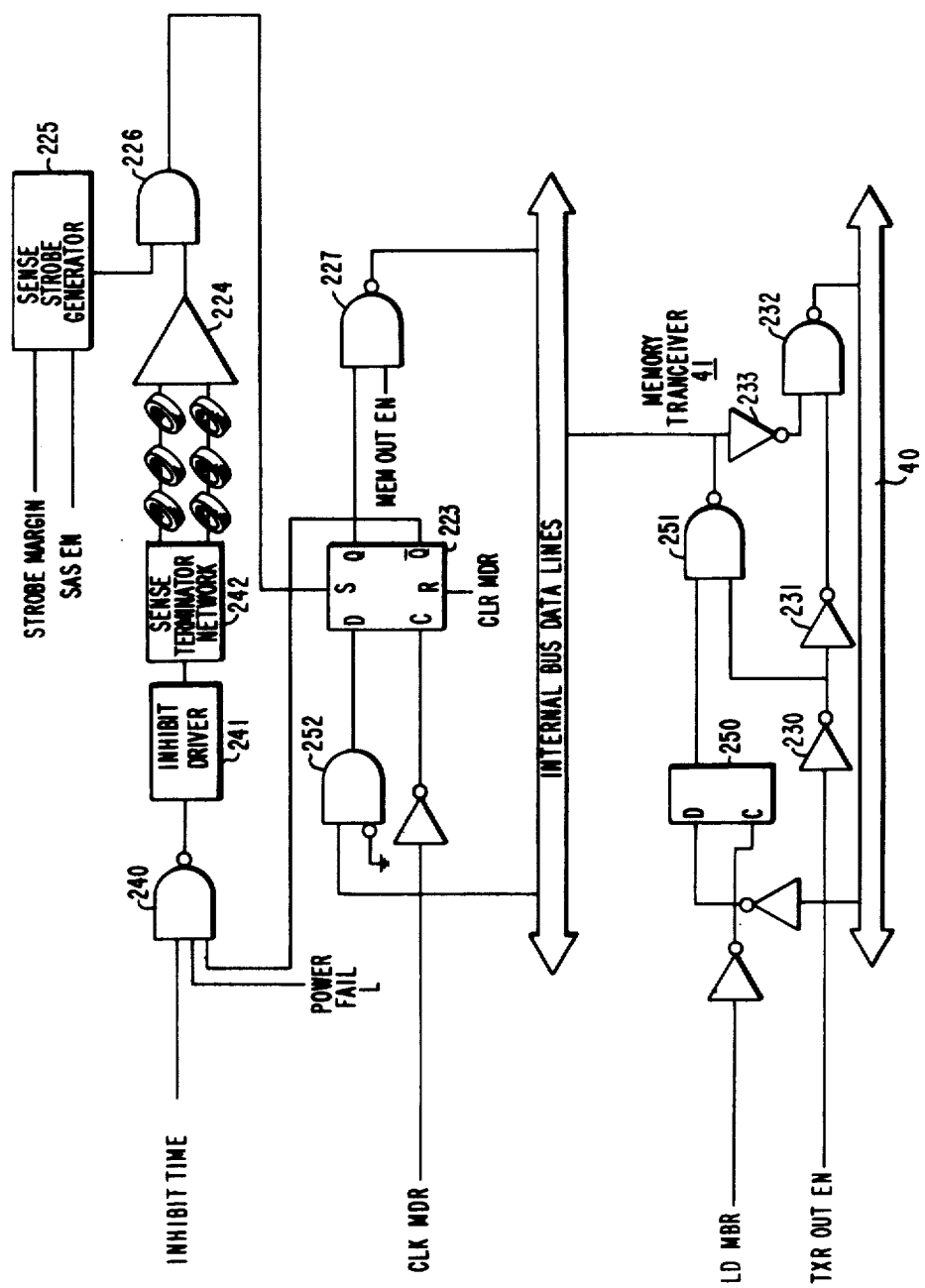
FIG. 20 is a simplified diagram of the circuitry associated with one data bit position in a memory stack and the corresponding elements in the memory transceiver of FIG. 1.

Now referring to FIGS. 11, 15 and 20, the reading operation begins when the address and control signals appear on the bus 40. During a reading operation, the byte masking bits are not used. The other control signals which are used are the C1 and C0 signals, which indicate the reading operation and the parity signals. Assuming the requisite information is received at the controller in FIG. 11 with no errors, the appearance of the START signal on a corresponding control conductor initiates a reading operation. When the read timing generator 152 transmits the RT0 signal to the start memory cycle logic shown in FIG. 12 it sets the flip-flop 173 therein. Simultaneously, the control signal generator 145 transmits LD MBR, LOCK MAR, IACK, BOCC and READ EARLY signals.

The LD MBR signal corresponds to the START DELAY signal shown in FIG. 12. This signal clocks data at input data latches in the memory transceiver 41 in FIG. 1; it corresponds to the DATA GATING CONTROL signal shown in FIG. 1. However, that data is not thereafter used during a reading operation.

The LOCK MAR signal clocks the address signals into the memory address latch 154, the C0 and C1 control bits and byte mask byte into the latches 153 and the block address into the stack selection logic and latch 146. The IACK signal corresponds to the ACKNOWLEDGE signal shown in FIG. 11; it is transmitted through bus drivers 136 in FIG. 11 onto the bus 40.

Referring to FIG. 13, the RT0 signal energizes an OR gate 220, thereby to transmit a BOCC ENABLE signal to enable an AND gate 221. During a reading operation, this signal remains asserted until the memory controller removes the read data signals from the bus 40. As also shown in FIG. 13, during a reading cycle, the C0 and C1 bits energize an AND gate 222, thereby to transmit an ENABLE signal which energizes the AND gate 221, so the gate 221 transmits a bus occupied (BOCC) signal back to the drivers 136 in FIG. 11 and onto the bus 40.

The READ EARLY signal turns on the selected X and Y switches, the selected Y drivers and the X and Y current generators in the stack module and effectively turns on the Y current in the stacks.

As shown in FIG. 15, the next transitions which occur are the assertion of the CLR MDR signal and the termination of the LD MBR signal. The CLR MDR signal shown in FIG. 15 represents two signals. One signal is routed to a low stack and the other to the high stack (FIG. 1). These signals clear memory data registers in the memory stacks, i.e., a register comprising an array of flip-flops 223 shown in FIG. 20. This clearing operation is necessary to initialize the registers so that stages therein can be subsequently directly set during the destructive reading operation of the cores. Also flip-flops, corresponding to the flip-flop 223, in unselected stacks must be cleared so that when read data is gated to the memory controller the internal bus lines are asserted only by data from the selected stack.

During the CLR MDR pulse, the control signal generator 145 in FIG. 11 asserts the READ LATE signal. This signal turns on the X drivers in the selected stack and forces current through the X wires. The cores being addressed are now destructively read. The selected Y drivers are not yet turned on, to allow transients to settle as long as possible before the cores being addressed are switched. When the latter occurs, a sense amplifier, such as the sense amplifier 224 in FIG. 20, connected to the appropriate sense-inhibit lines, produces an output voltage. A sense strobe generator 225 enables an AND gate 226 to directly set the flip-flop 223 if the selected core contains a ONE. Otherwise the flip-flop 223 remains reset. As shown in FIG. 20, and previously discussed, the timing of the sense strobe generator can be controlled by the strobe margin signal, generated as shown in FIG. 14.

Next the timing and control signal generator 145 (FIG. 11) transmits the SAS EN signal. This signal, shown in FIG. 15, represents one of four signals which are controlled by the byte mask signals from the latches 153. During a reading operation all four SAS EN signals are asserted so that the sense strobe generator 225 strobes all bytes into the internal data register comprising flip-flops 223.

Before the control signal generator 145 terminates the SAS EN signal, it also produces a ST WRITE pulse that initializes the write timing generator 156 and begins a timing sequence with a WT0 signal. When the ST WRITE pulse terminates, the control signal generator 145 also terminates the SAS EN signal and asserted an MEM OUT EN signal. As shown in FIG. 20, this signal enables NAND gates, such as a NAND gate 227, to couple onto the data lines which connect to the transceiver 41 in FIG. 1, a ground assertion signal representing the state of the flip-flops 223, i.e., the data which is to be retrieved from the memory 29. Thereafter, the control signal generator 145 transmits the TXR OUT EN signal which, conditioned by inverters 230 and 231, enables NAND gates 232 to couple the bus data from internal bus data lines through inverters 233 and onto the bus 40. The TXR OUT EN signal terminates with the MEM OUT EN signal.

When the MEM OUT EN signal terminates, the memory transceiver 41 is conditioned to couple data from the bus 40 to the internal bus. At this same time, the BOCC TIME signal terminates, so the AND gate 221 (FIG. 13) terminates the BUS OCCUPIED signal on the bus 40, thereby to indicate to the associative memory that the bus is free for a subsequent operation.

While the TXR OUT EN signal is asserted, the control signal generator 145 also transmits the DATA READY signal, which passes through the memory transceiver 41 onto the bus 40 as a control signal. This informs the bus master that the data that has been requested is on the bus 40 and enables latches within the bus master to read the data.

As previously indicated, the ST WRITE signal shown in FIG. 15 initiates a timing sequence by the write timing generator 156 in FIG. 11. Simultaneously with the transmission of the TXR OUT EN signal by the control signal generator 145, signals from the write timing generator 156 cause the generator 145 to transmit ST CHG and WRITE EARLY signals. The ST CHG signal is routed to the selected stacks in response to the STACK SEL signals from the stack selection logic and switch 146. It activates a stack charge circuit used in subsequent writing operation. The WRITE EARLY signal turns on selected X and Y switches and the X and Y current generators in the stack module sets enabled by the STACK SEL signals. Next, the control signal generator 145 transmits the WRITE LATE and INHIBIT TIME signals. The inhibiting signal is routed to a NAND gate 240 in FIG. 20. It provides the timing for turning on the inhibit driver 241, depending upon the condition of the flip-flop 223. If the flip-flop 223 is cleared, representing a ZERO value that was read, the corresponding inhibit driver 241 is not energized. If the flip-flop contains a ONE, however, the inhibit driver 241 is enabled to drive the inhibit winding through a sense terminator network 242. This operation thus rewrites into the stack the data that was destructively retrieved therefrom during the reading operation. When these four signals from the control signal generator 145 terminate, there is a delay and then the control signal generator transmits an END pulse which clears the timing generators and terminates the BUSY, LOCK and LOCK MAR signals, thereby enabling the stack to initiate a subsequent operation.

Writing Operation

Figure 16:
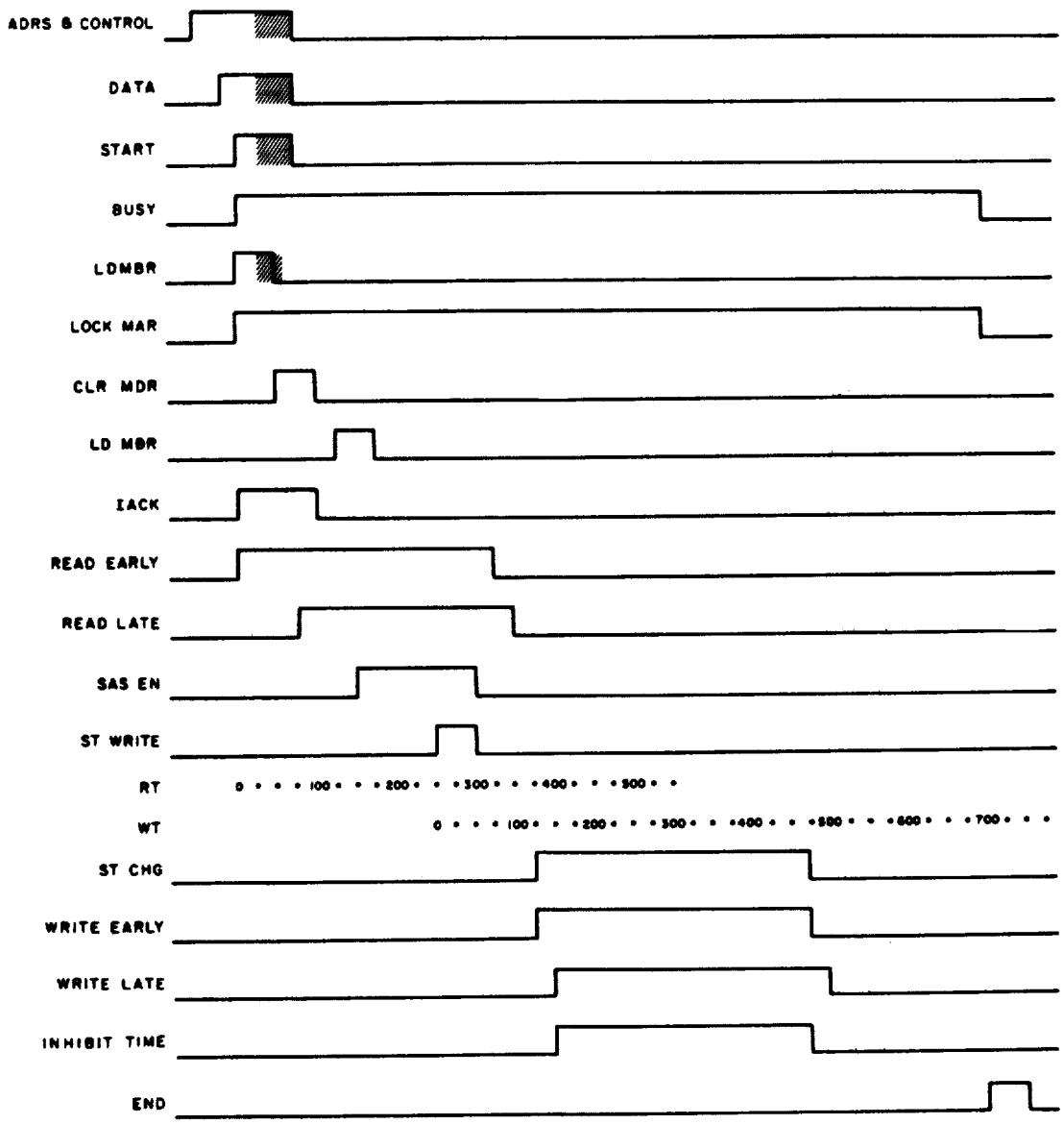
FIG. 16 is a timing diagram that illustrates the timing signals that are transferred between a memory controller and a memory stack in FIG. 11 during a transfer from the associative memory to the memory module.
Figure 17:
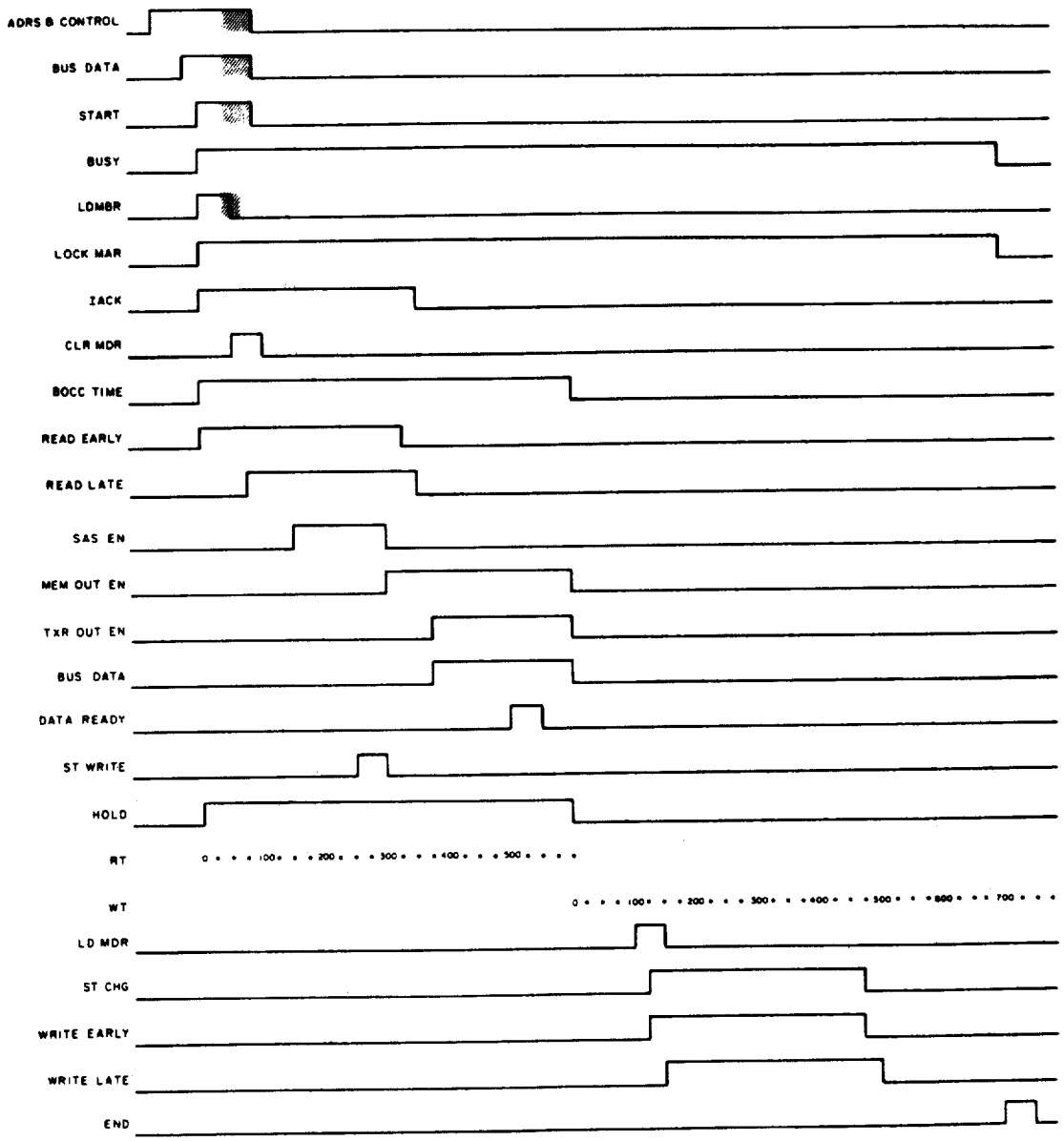
FIG. 17 is a timing diagram that illustrates the timing signals that are transferred between a memory controller and a memory stack during an exchange of the contents of a location in the associative memory and the contents of the location in memory module.

The second type of operation that can occur is a writing operation. The sequence of timing signals in the writing operation is shown in FIG. 16. During a writing operation, the bus master produces on the bus 40 the ADDRESS, BYTE MASK signals, C0 and C1 signals indicating a write operation and MAIN ADDRESS PARITY signals. Shortly thereafter the bus master transmits onto the data lines the data signals and then transmits the START signal. As previously indicated, the START signal causes the start memory cycle logic 145 to transmit the START DELAY signal and initiate the timing sequence and, as also previously indicated, it causes the control signal generator 145 to transmit the BUSY, LD MBR, LOCK MAR, IACK and READ EARLY signals.

Next the control signal generator 145 terminates the LD MBR signal and loads the data into the latch 250 in the memory transceiver 41 (FIG. 20). Simultaneously it transmits the CLR MDR signal, thereby to clear the flip-flops 223. Next the control signal generator 145 transmits the READ LATE signal, thereby to clear the cores in the designated address, which is necessary before a writing operation can occur. The CLR MDR signal then terminates and the LD MBR signal is asserted. The TXR OUT EN signal is active during this interval, so the inverter 230 enables a NAND gate 251 to couple a signal onto the internal bus which corresponds to the data to be transferred. This signal is coupled through a receiver 252, so the LD MBR signal loads the data into the latches corresponding to the flip-flop 223. The control signal generator 145 also transmits the READ LATE signal, thereby destroying the data in the cores.

The SAS EN signals complement the byte mask signals. Thus, if byte 0 is to be written, EN SAS BYTE signals 1-3 are asserted, so that the data in the cores is stored in the corresponding ones of the flip-flops 223. If the byte is to be written, then the sense strobe generator 225 associated with that particular byte and the AND gates 226 are not enabled to couple the data to the flip-flop 223. Thus, at the termination of the READ LATE signal, the latches corresponding to the flip-flop 223 store data corresponding to the data to be written into the new bytes and, with respect to any other bytes, the data originally stored in those bytes.

As in a prior reading operation, the control signal generator thereafter transmits the ST CHG, WRITE EARLY, WRITE LATE and INHIBIT TIME signals to restore the data to the cores and then transmits the END signal to terminate the operation.

Exchange Operation

The third type of an operation which can be performed in this system is an exchange operation during which data in latches in the bus master and data in a designated memory location are exchanged. During an exchange operation, the bus master effectively performs a writing operation, thereby placing the address of the memory location, the control signals indicating an exchange operation, and the data, onto the bus 40. When the memory controller shown in FIG. 11 initiates the operation, it transmits the BUSY, LD MBR signals, LOCK MAR and IACK signals. It also transmits the BOCC TIME and READ EARLY signals. These all perform the same functions as previously indicated and, when the LD MBR signal terminates, the data to be loaded into the memory location is stored in the flip-flops 250. Next the system utilizes the CLR MDR signals to clear the flip-flops 223 and initiates the READ LATE signals. The SAS EN signals control which bytes will be thereafter read into the flip-flops 223 in order to provide an exchange operation on a byte-by-byte basis. When the SAS EN signals terminate, the control signal generator 145 transmits an MEM OUT EN signal, thereby to enable the NAND gates 227 to couple data onto the internal bus data lines. Then the control signal generator 145 transmits the TXR OUT EN signal, to enable the selected bytes to pass onto the bus 40, and produces the DATA READY signal. In addition, the control signal generator 145 transmits over this entire interval the HOLD signal, which prevents the write timing generator from transmitting any signals.

Once the reading operation is terminated, however, the write timing generator 156 is enabled to initiate its timing sequence. The first signal which is then transmitted from the generator 145 is the LD MBR signal which loads into the transceiver flip-flops 250 (FIG. 20) the data to be stored in memory in the exchange. Writing is done on a byte-by-byte basis and the LD MBR signal for a particular byte is asserted only if the corresponding byte mask bit is asserted. Thus, only the bytes to be written are loaded into the flip-flops 223 (FIG. 20). This loading operation occurs beause the TXR OUT EN signal terminates at the end of the reading operation and thereby enables the NAND gate 251 to couple the data in the flip-flops 251 onto the internal data bus. The remainder of the writing operation then occurs as previously discussed and the memory cycle then terminates.

In summary, there has been described in this application a highly efficient associative memory system for a data processing system. In accordance with the principle of locality, the instances of "hits" in the associative memory materially outnumber the number of "misses" so that the effective speed of data transfer from memory to processor is greatly increased. Moreover as previously indicated, this arrangement is capable of providing a large memroy (e.g., 4 million bytes of random access memory) in a cost-effective manner from which data can be retrieved at an extremely rapid rate. Also, as shown especially in FIG. 11, each memory controller contains circuitry that enables diverse types of memory stacks to be intermixed within a given memory module. Interleaving operations also are provided. In combination, all these elements provide a memory system which can furnish data words to the processor at a rate which greatly exceeds the rate normally imposed by the characteristic retrieval intervals of the memory units.

The foregoing detailed description is of a particular embodiment of a data processing system and memory circuits for implementing this invention. It will be apparent, however, that many modifications and variations exist and might be used to adapt this invention for other types of data processing systems. Therefore, it is the object of the appended claims to cover all such variations and modifications as come within the true spirit and scope of this invention.

What is claimed as new and desired to be secured by Letters Patent of the United States is:

1. A random access memory module for use in a digital data processing system that transmits electrical signals including sets of address signals, data signals and control signals, the control signals including a transfer control signal used to transfer data between said memory module and the digital data processing system and binary margin control signals for controlling operations in said memory module, said random access memory module comprising:
   A. addressable storage means for storing digital data at individually addressed storage locations therein, said addressable storage means including means responsive to an analog signal for controlling the operation thereof,
   B. address decoding means for generating an enabling signal when address decoding receives, from the digital data processing means, a set of address signals that identify a storage location in said addressable storage means,
   C. timing means connected to said addressable storage means and said address decoding means, said timing means being responsive to the enabling signal and a transfer control signal for initiating a memory retrieval cycle during which data is transferred between the identified storage location and the digital data processing system, and
   D. digital-to-analog conversion means responsive to the binary margin control signal received from the digital data processing system for generating an analog signal, and
   E. control means connected to said addressable storage means and said conversion means for controlling the operation of said addressable storage means in response to the analog signal.

2. A random access memory module as recited in claim 1 wherein said addressable storage means comprises binary storage elements at each said storage location, sensing amplifier means connected to said storage elements, output gating means connected to said sensing amplifier means and a strobe pulse generator for enabling said gating means to produce data signals that correspond to the signals from a said storage location, the timing of strobe generator being responsive to the analog signal.

3. A random access memory module as recited in claim 1 wherein said addressable storage means includes:
   i. coincident current storage means, and
   ii. means responsive to the binary address signals for generating selection currents thereby to select one said coincident current storage means, and
   iii. Means for controlling the magnitude of the selection currents in response to the analog control signal.

4. A random access memory module as recited in claim 1 wherein said module includes a plurality of said control means for controlling different operations of said addressable storage means and wherein said digital-to-digital conversion means includes:
   i. decoding means that receive the binary margin control signals for generating one of a plurality of analog control signals, and wherein the number of the control means is less than the number of combinations that the binary margin control signals can define, and ii. means responsive to the binary margin control signals that correspond to the values that do not have a corresponding control means for transmitting a signal thereby to disable said timing means, said random access memory module additionally comprising means responsive to the signal for transmitting said signal to the digital data processing system.

* * * * *